United States Patent [19]

Burns et al.

[11] Patent Number: 4,791,629
[45] Date of Patent: Dec. 13, 1988

[54] COMMUNICATIONS SWITCHING SYSTEM

[75] Inventors: C. A. Burns, Palo Alto, Calif.; Calvin H. DeCoursey, Reno, Nev.; Hans H. Junker, Mountain View, Calif.

[73] Assignee: IBM Corporation, Santa Clara, Calif.

[21] Appl. No.: 869,580

[22] Filed: Jun. 2, 1986

[51] Int. Cl.[4] .............................................. H04J 3/16
[52] U.S. Cl. ........................................ 370/85; 370/95
[58] Field of Search ................ 370/85, 95, 89, 86, 370/94, 110.1, 67

[56] References Cited

U.S. PATENT DOCUMENTS

| | | | |
|---|---|---|---|
| 4,549,291 | 10/1985 | Re Noulin et al. | 370/89 |
| 4,628,504 | 12/1986 | Brown | 370/85 |
| 4,630,263 | 12/1986 | Townsend et al. | 370/85 |
| 4,663,758 | 5/1987 | Lambarelli et al. | 370/85 |

Primary Examiner—Douglas W. Olms
Attorney, Agent, or Firm—Blakely, Sokoloff, Taylor & Zafman

[57] ABSTRACT

A communication switching system in which control functions are distributed homogeneously, as opposed to being distributed by individual function, throughout the system. A plurality of controllers are coupled to a time division multiplex (TDM) bidirectional bus. Each controller includes a microprocessor to perform control functions. An interface element on the controller accesses the TDM bus while a switching element on each controller controls access between the interface element and the microprocessor. The switching element and interface element include storage areas which are double buffered to allow for more efficient operation and use of the memory space. The TDM bus is divided into a plurality of time slots. Each controller is assigned certain of the time slots and utilizes those time slots to communicate with other controllers. The system includes provisions for dynamic allocation of time slots.

16 Claims, 15 Drawing Sheets

INTERFACE ELEMENT
ADDRESS SPACE

COMMUNICATIONS SWITCHING SYSTEM

BACKGROUND OF THE INVENTION

1. Field of the Invention

This invention relates to the field of switching systems for communication networks.

2. Prior Art

There are many commercially available computerized branch exchanges used for the switching of voice signals as well as data signals. A common feature of these systems is the conversion of analog signals to digital and the transmission of such digital voice signals and digital data signals over a common bus. One such system is described in U.S. patent application Ser. No. 613,026 for "Time Division Multiplexed Computerized Branch Exchange," filed May 22, 1984.

A disadvantage of prior art switching systems is the utilization of centralized control capacity. A switching system utilizes a Time Division Multiplexed (TDM) bus divided into time slots which are assigned to various stations by the central controller. Although the maximum capacity of the system may not be currently in use, the entire control system must be provided for. Such a system is inefficient for users and does not have flexibility beyond the capacity of the original control unit. In addition, prior art switching systems are not fault tolerant, if there is a failure in the controller, the entire system fails. Further, in order to modify the system once in place, the entire system must be shut down prior to making additions.

In addition, it is often desired to provide a switching system that is user configurable. For example, by programming at a system level, certain phone stations may be restricted from making long distance calls, programmed to emit coded tones depending on the type of incoming calls, etc. In prior art systems, such programming is lost upon the occurance of power failure or performance of maintenance on the system. Further, individual stations may be user configured form memory dialing, quick dial, etc. This individual programming may also be lost during system failures and maintenance operations.

Therefore, it is an object of the present invention to provide a switching system which does not require the provision of a large control unit for initial application.

It is a further object of the present invention to provide a fault tolerant switching system.

It is as yet another object of the present invention to provide a switching system which can be modified when it is in place without disturbing the system.

It is as another object of the present invention to provide a switching system in which system and station user configurations are retained during power down situations.

SUMMARY OF THE INVENTION

Improved software and architecture for a time division multiplexed bus in a communication switching system is described. In the preferred embodiment, the communication system includes a plurality of shelf cards coupled to a TDM bus. Each shelf includes slots for up to nine controllers, with each controller controlling eight stations (digital phones or analog interfaces).

The system software consists of two levels. A lower level is a real time code which is interrupt driven and is imlemented in an assembly code appropriate to the processor of each controller. The real time code works synchronously to control eight digital or eight analog interfaces and intercontroller communications between controllers.

An upper level of software consists of functional multi-tasking software. This software is concerned with call set up and call processing duties for the eight stations or eight trunks it controls. Each station or trunk has two tasks associated with it. The duty of one task is to monitor the status information passed from the interface including key codes from a digital interface or trunk status information from an analog interface. The other task monitors packet information passed to it from other stations or trunks in the system via the TDM bus. Therefore, a total of sixteen tasks are used to control eight stations or trunks.

The two software levels communicate with each other via a set of I/O FIFOs. These FIFOs allow status information to be passed between the two levels of the software.

With the present invention, more control capacity is added as the system is upgraded. The system is also fault tolerant, since, if a controller fails, only eight lines are lost. The TDM bus in the present invention is divided into a plurality of time slots, with the time slots combined into frames and the frames combined into superframes. In order to insure communication between each controller, each controller transmits messages to another controller once each superframe. As a result, after a fixed number of superframes, each controller will have communicated to every other controller, limiting the worst case situation of a shorted communication. Each controller has certain time slots permanently assigned to it so as to avoid message collisions. However, the bus may include unassigned time slots which may be dynamically allocated to individual controllers as the need arises.

The present invention provides a communication switching system which acts as both a key system and a personal branch exchange (PBX). The only distinction is how outside resources are selected (key input versus access code). Thus, all functions can be acted upon by the present system.

The interface element and switchng element of the controller are integrated circuits which utilize double buffering of storage space to allow more efficient use of memory without decreasing access time.

DETAILED DESCRIPTION OF THE INVENTION

A communication switching system is described which utilizes individual control elements which are added as the capacity of the network is expanded. In the following description, numerous specific details are set forth, such as clocking rates, number of controllers, etc., in order to provide a more thorough understanding of the present invention. It will be obvious, however, to one skilled in the art that the present invention may be practiced without these specific details. In other instances, well known circuits have not been shown in detail in order not to unnecessarily obscure the present invention.

SYSTEM OVERVIEW

The present invention provides a digital switching system for use as part of a communications system. The system can transmit voice signals (such as in a telephone system) or data signals (from information sources, such as computers). In the past, such systems have only been available for large numbers of lines. A user had to obtain and pay for an entire system even if he only could use a portion of its capacity.

The present invention provides digital switching for systems containing anywhere from eight to one hundred and forty-four digital lines. The control function of the system of the present invention is distributed throughout the system in a slice organization. Correspondingly, the control capacity, and therefore the cost, is a linear function of the number of lines to be serviced.

If the preferred embodiment of the present invention, the control function is distributed so that each slice controls eight ports and is substantially self sufficient. The system may be thought of as a collection of personal branch exchanges. A single medium (a time division multiplsxed bus) is used for al system communications, voice, data and control. There is no clearing house for message transaction, all communications take place between consenting slices. The performance of the system is made independent of the system load and configuration by designing the software for worst case situations.

As noted previously, the present invention utilizes a unique two level software configuration in which a synchronous functional code is accessed as necessary without disturbing the operation of the synchronous real time code. The real time code and functional code communicate with each other via FIFOs and exchange information such as intercontroller packet information, station display information, key code information and trunk status information, etc.

SOFTWARE CONFIGURATION

Figure 8:
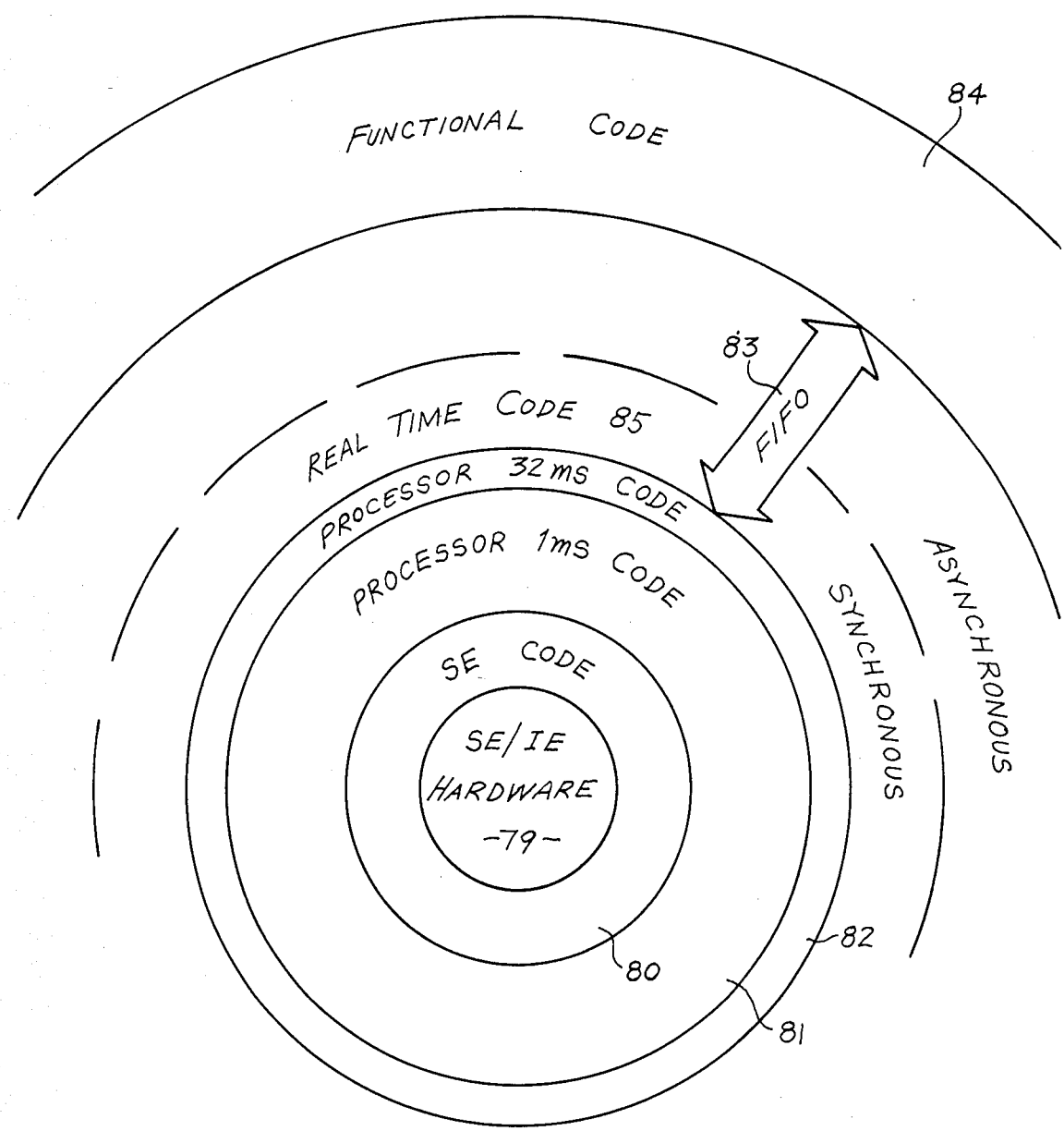
FIG. 8 is a block diagram illustrating the software division of the present invention.

FIG. 8 is a functional block diagram illustrating the software configuration of the present invention. The two levels of software are the upper level, functional code 84 and lower real time code 85. The functional coda 84 communicates with the real time code 85 through means of FIFOs 83. The FIFOs 83 act as buffers between the functional code, which is asynchronous, and the real time code which operates synchronously with the processors of each controller.

The real time code 85 is further sub-divided into a plurality of levels. At the core of the real time code is the switching element (SE)/interface element (IE) hardware 79. Surrounding that is the SE code 80 which is executed once each frame and is utilized to make connections between the Xbus, link/codec, and the processor bus; make gain adjustments to link/codec samples; generate composite progress tones (ring back, dial tone, busy back, etc.) and handle conferencing and voice override.

Surrounding the SE code is a one millisecond interrupt. During the one millisecond interrupt, each control processor polls one of a variety of the input/output FIFOs 83. Data is taken from the FIFOs and put into a superframe buffer memory space. The administrative and analog controllers then put a data block into a FIFO buffer. The controller maintains general purpose counters, does a DRAM refresh, checks for multi-millisecond cycles and returns from the interrupt.

Surrounding the one millisecond interrupt is a thirty-two millisecond interrupt. During the thirty-two millisecond interrupt the controller terminates a prior packet cycle, determines the new packet mode and starts the next packet cycle. It also checks to see if the current rask being performed has exceeded the processor time threshhold and if so sets a flag. The controller then returns from the thirty-two millisecond interrupt.

During the one millisecond interrupt, the present invention processes the real time codes. It allows the SE and IE to act in retrieving and restoring information into the buffers.

SOFTWARE FUNCTIONALITY

The SEP 64 has 10 different modules of software that it can run depending on the controller functionality. One of these modules will be linked in depending on what the current controller is controlling. The SEP 64 executes a module every frame. The following is a list of the software modules:

1. Single Controller Switching Element A
2. Single Controller Switching Element B
3. Digital Station Controller
4. Digital Station Controller Plus Two Conference Three Ways
5. Analog Peripheral Controller
6. Analog Peripheral Controller Plus Progress Tone and Conference Three Ways
7. Analog Peripheral Controller With Gain
8. Analog Peripheral Controller With Gain Plus Progress Tones (Generates ringback, busy signal, etc.)
9. Unattached Controller With Two Conference Three Ways and a Conference Seven Ways
10. Unattached Controller With Four Conference Three Ways and Progress Tones

REAL TIME SYSTEM

The heart of the real time system is the one millisecond interrupt process with occurs on the late superframe boundary. This interrupt cycle is synchronize with the SEP 64. The real time system interfaces with the 6809 double buffered memory to input and output data to the SEP 64. The real time system can be started with a callable routine which in the preferred embodiment is pascal and is called RTINIT. RTINIT sets up the following:

1. The callable routine calls STNINIT or TMINIT depending on whether the current controller is connected to a digital interface or an analog interface. STNINIT initializes all data structures and variables in the processor 29 memory space pertaining to digital stations. TMINIT does the same for analog devices.

2. The following input/output FIFOs are initialized:
   (a) POFIFO (IC packet output)
   (b) PIFIFO (IC packet input).
   (c) IEOFIFO (data/address information for frame space storage in the IE)
   (d) LOCALS (local resource list)
   (e) HS buff (high speed packet buffer)

3. Load SE code from link location into SE memory space.

4. Set up the processor 29 interface buffers 54A and 54B. In buffer 54A, the IC output packet is set to NIL. The address of the time slot base pointer in frame space and the current controller's time slot base count are loaded into the IEOFIFO. Also, the current controllers port number, and local time slot count are loaded into the IEOFIFO. The reasoning for this is so that when the one millisecond interrupt is started, the data in the IEOFIFO will be stored in the specified locations in frame space memory.

5. SE master clear is removed. All LED, station power and auxiliaries and the one millisecond interrupt is enabled. Once the one millisecond interrupt has been enabled, the interrupt code has been estimated to consume at worst case 35% of the real time. But this will only occur once every 32 interrupts. At other times, the interrupt code executed is far less than 35%. When the processor 29 is not executing the interrupt code, it is executing the functional pascal code. The interrupt process occurs every one millisecond at the late superframe boundary. The main duties of the interrupt include the following:

1. Outputting and inputting the link output and link input packet.
2. Outputting data values to be located in frame space by the SEP 64.
3. Outputting the intercontroller output packets and determining when to output the intercontroller packets so that all other controllers in the system have a chance to read them.
4. Inputting a new intercontroller input packet from a different controller.
5. Checking for master reset and power failure detection.
6. Running the station monitor or trunk monitor to manage the links or trunks in which the controller is interfacing.

1. LINK INPUT AND OUTPUT PROCESS

If a digital controller, 8 bytes of data are moved from processor 29 memory into the link output packet buffer in the SE memory. Eight bytes of data are moved from the link input packet buffer in SE memory to processor 29 memory. Also, the uplink errors are read from SE memory into processor 29 memory. If an analog controller, dial finite state machine (DIAL FSM) is executed.

2. IE OUTPUT PROCESS

Data values are stored into SE buffer memory which are read by the SEP 64 and stored into frame space. These values include the next intercontroller corresponding address, the link input and output channel pointer, and data values stored in the IEOFIFO. Values in the IEOFIFO can be any values that are in frame space including corresponding addresses, time slot registers, link control and codec enable etc.

3. INTERCONTROLLER OUTPUT PACKET PROCESS

This process determines whether the next output packet is a NIL packet, status packet, low speed packet, or high speed packet. If the next packet is a NIL packet, a NIL packet is stored into the IC packet output buffer in the SE memory. If the packet is a status packet, the STAT packet is moved to the SE. If a low speed packet is seen, the next packet in the PFIFO is moved into the SE. Otherwise, the next packet is a high speed packet and the next packet in the HS BJFF is stored. A high speed packet is a packet from the HS BJFF. A new packet is sent every superframe period. This kind of packet communication is used for downloading purposes. The current controller is locked onto the destination controller and the intercontroller corresponding address in frame space will not be changed to another controller port every superframe. A low speed packet is a packet POFIFO the same packet is sent every 32 milliseconds. Therefore, this packet is not removed from the top of the FIFO until 32 milliseconds are up. Therefore, it will be guaranteed that every controller in the system will receive the packet.

4. READ IN IC INPUT PACKET BUFFER

This process determines whether the packet in the IC input packet buffer is for the current controller. If it is, the packet is moved into the PIFIFO from SE memory.

5. POST PROCESSOR

This process checks for master reset, power failure detect, and maintains the general purpose counter and one second counter. In addition, this process wakes up all functional tasks, determines whether to execute the CYCPRC and executes the station monitor (STNMON) or trunk monitor (TRNKMON).

6. INTERCONTROLLER PACKET CYCLE PROCESSOR

This process is invoked once every 32 milliseconds. The process removes the top packet on the PROFIFO and resets the HS BUFF output pointer to the beginning. It then determines whether it is time to transmit a status packet. A status packet is transmitted from the lOCAL FIFO every 256 milliseconds. Actual status information is looked up in the local directory. Next, the process determines whether there are any low speed packets into PROFIFO FIFO. Or any high speed packets in the HS BUFF. After the next packet is determined, the packet source flag (P source) is set to be used in the intercontroller output process (POPROC) to mark the FIFO with the next ready packet. The packet is then processed in the next interrupt cycle.

Figure 11:
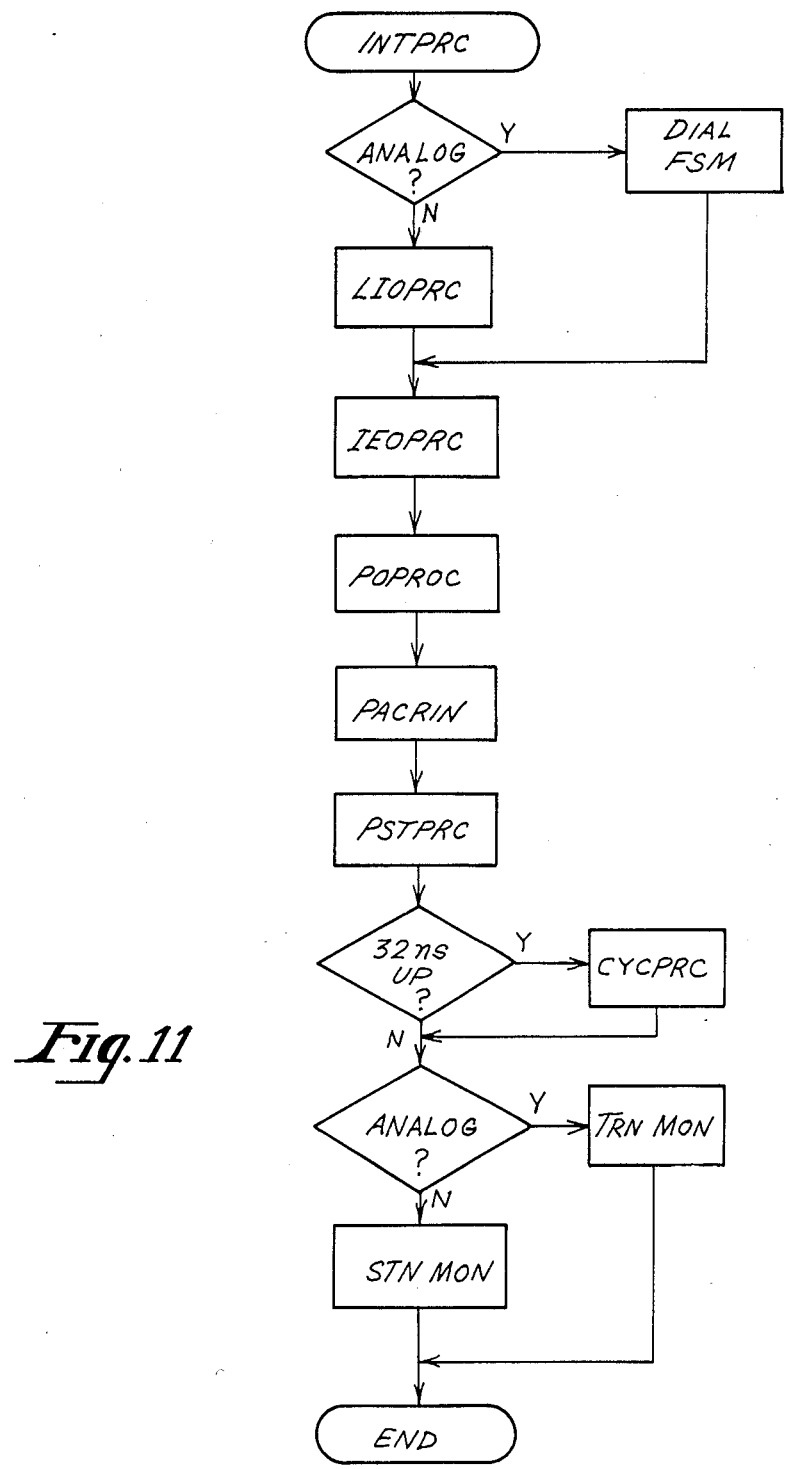
FIG. 11 is a flow chart illustrating the one millisecond interrupt routine of the present invention.

The one millisecond interrupt routine is illustrated in FIG. 11.

STNMON-STATION MONITOR

The station monitor contains the software which controls the current status of the links and determines what sequences of commands to send down the link. It also deciphers all commands coming up link. The data sent up link (or received down link) is outputted (or collected) in a particular format called a paradigm. A paradigm is defined as a fixed number of packets (a packet being 8 bytes) which will be outputted or inputted continuously for a given number of milliseconds. A paradigm contains control commands along with the raw data valuss intersperced into fixed locations within the paradigm. The format of the paradigm will depend on the function the paradigm performs.

The following is a list of different paradigms used in the present invention:

1. Cold Start Paradigm—this paradigm contains commands to initialize the digital station from a cold start state. This includes the setting of phase delays and margining of the links.
2. Station ID Paradigm—this paradigm sends commands to the phone to return the station type.
3. Read Station Key Paradigm—this paradigm sends commands to the phone to return a station key release or depression.
4. Write NOP Paradigm—this paradigm sends commands to the phone to write data to the voice control register.
5. Station LED Write Paradigm—this paradigm sends commands to the phone to write a station LED/CADENCE value to the phone.
6. One Byte Display Write Paradigm—this paradigm sends commands to the phone to write one ascii byte to the phone display.
7. Four Byte Display Write Paradigm—this paradigm sends commands to the phone to write four ascii bytes to the phone display.
8. Read Uplinks Status Paradigm—this paradigm sends commands to the phone to return the contents of the uplink status register of the phone display.

An entire paradigm (56 bytes) will take 7 superframes to be outputted. One more superframe is required to poll the station two stations ahead in order to determine what paradigm to make and send to that station. Therefore, every 8 superframes a new paradigm is sent to a new station and the next paradigm is determined. The polling paradigm READ UPLINK STATUS paradigm. After a paradigm has been completely down link, a 2 millisecond delay is required before a paradigm has been completely collected from the same station. At this time, it is safe to analyze the paradigm containing data from the station. The priority as to which station to send the next paradigm is a simple sequential order, start with station 0 to station 7 and repeat again.

It takes 64 milliseconds before a particular station is polled again. After a paradigm has been received, the paradigm type for the next station is choosen depending on the state of the phone, the number of key codes in the key FIFO for that station, the number of display bytes in the display FIFO, and the number of the LED codes in the LED FIFO. Also, after a paradigm is received from a particular station, the digital finite state machine will be run on that particular link.

GUIDE TO THE FUNCTIONAL DATA

There are three functional code modules, the MASTER code, DIGFC code (Digital Functional Code) and the ANAFC code (Analog Functional Code). Each controller contains the entire code module for its function, but test are performed to conditionally enable or disable the relative subsets of the code. For example, the MASTER code module is downloaded into every controller. However, conferencers do not use the same parts of the code that administrators use.

There are two categories of functional data, fixed and volatile. Fixed data contains all tha permanent characteristics of the system (e.g., the directory, trunk group and route discriptors, ROLM phone characteristics, etc.). Fixed data is configured and loaded into the controllers when power is turned on or the system is reset. Some fixed items applying to the phone may be reprogrammed by the user of the phone.

Volatile data consists of items which are needed for a single transaction and are discarded are stored in a volatile data, e.g., the accumulator for the number being dialed. Volatile data is not preserved during power down.

The structures of the records may be changed, but every module that refers to any changed record must be recompiled. Parts of the real time code and administrator code use the structures, and they must be recompiled. In the preferred embodiment, pascal code is utilized with a common header file being TDMHED:-DAR. All structures should be declared there. Fixed data includes the following:

1. Directory
2. Sys
3. Toolrout
4. Trunk Group
5. Ring Rules (on digital controllers only)
6. Sysstorage (on digital controllers only)
7. Stfixed (trfixed on analog controllers)

DIRECTORY

The directory is the backbone of the entire system. Directory describes the type, extension number and physical address of resource, the group to which it belongs and whether it is on the hunt and pick-up list for that group.

SYS

The SYS is a small area of memory containing a few bytes of system information.

TOOLROUT

Toolrout describes the routes available.

TRUNK GROUP

Trunk Group describes the trunk groups and appears on all controllers because certain information is needed by other resources.

RING RULES

Ring Rules is a small area describing the ringing rules.

SYSSTORAGE

Sysstorage contains the system speed dial numbers. Local speed dial numbers for each station are contained in ST fixed.

STFIXED

Stfixed is an array of 8 records describing the 8 ROLM phones on that controller, as TRFIXED describes 8 trunks on an analog controller.

The configuration of each is established by the system administrator or by default.

Resources identify themselves by their directory index. That gives their correspondent a point of further information about the resource. PORT is the port number of the resource, the "physical address." The real time code uses it to direct the packets. The DOAUDIO procedure uses it to select which source of sound a resource will hear. Group headers have no physical address, so in the case of trunk groups, this field holds the index of the trunk group record that describes the group.

SE CODE

All of the SE code modules are organized such that they have four parts: a prologue, a main body, an epilogue and, if necessary, data.

The prologue sets up correspondent address (port) for intercontroller reading. It also resets ESF (early superframe) addresses at frame 7 and late superframe (LSF) addresses at frame 1. Further, the prologue moves the IE register from superframe space to frame space.

The main body moves voice data from a link/codec to the Xbus 23 and moves voice data from Xbus 23 to the a link/codec (possibly with gain adjust). The main body forms controller specific special functions such as, conferencing, voice override and progress tone generation.

The epilogue moves "packetized" data from superframes space to frame space and from frame space to superframe space. It also increments the ESF/LSF addresses.

The data is used by the SC in the wave form tables to generate all tones for the system of the present invention and is used by the processor 29 for look up tables used as arrays of pointers. An example of several specific SE modules is attached hereto as Exhibit A.

SYSTEM ARCHITECTURE

Figure 1:
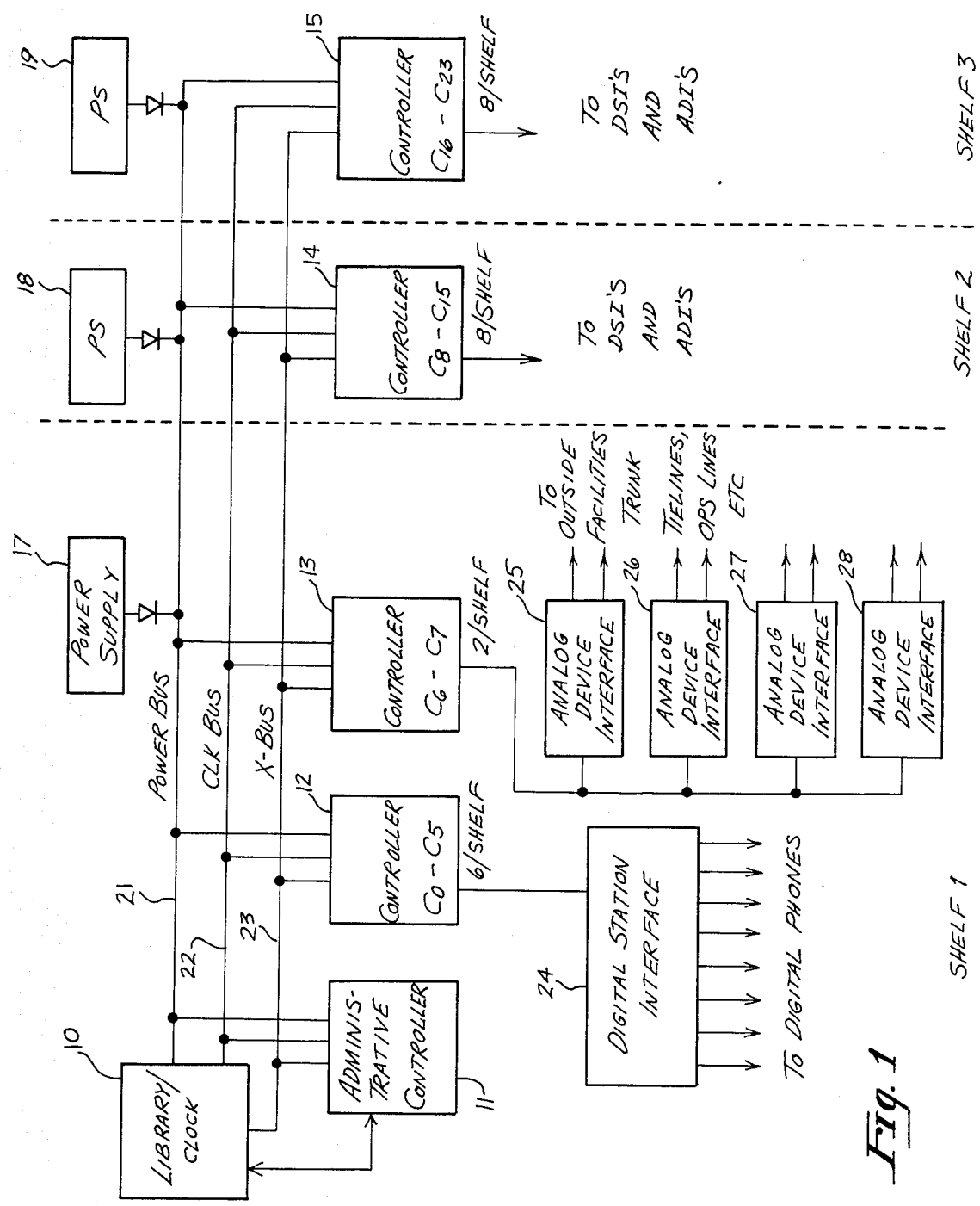
FIG. 1 is a block diagram illustrating the layout of the present invention.

FIG. 1 illustrates the architecture of the preferred embodiment of the present invention. The switching network comprises a power bus 21, clock bus 22, Xbus 23 and a plurality of shelves, each containing a plurality of controllers, such as shelves 1-3. As noted above, the Xbus 23 is a time division multiplexed (TDM) bus which carries communications between the controllers for all voice, data and control signals. A single clock bus 22 is used to provide clocking signals to each of the controllers. Power bus 21 is coupled to each shelf and, as will be described more fully below, a plurality of individual power supplies.

Each shelf includes its own power supply, such as power supplies 17, 18 and 19 of FIG. 1. In the preferred embodiment of the present invention, power supplies are diode or'ed to the power bus 21. Each power supply provides deregulated voltage to the power bus. The voltage is regulated by individual controllers on each of the shelves 1 through 3. By utilizing a separate power supply on each shelf, individual power supplies can be added to or removed from the system without affecting the system operation.

Each shelf contains a plurality of controllers. In the preferred embodiment of the present invention, there are slots on each shelf for 9 controllers. Six of these controllers are coupled to digital station interfaces two are coupled to analog device interfaces, and one is coupled to no interfaces but rather serves as an administrative controller.

Shelf one is used as the basic system. In addition to the controllers found on each shelf, shelf 1 contains a library clock card 10. The library clock card 10 contains timing generators which are used to provide clocking signals on the clock bus 22. The system software for the present invention is found in a plurality of EPROMS on the library clock card 10. The system configuration, (number of shelves, location and types of controllers) is stored in non-volatile RAM on the library clock card 10.

The library clock card 10 includes a dynamic RAM memory containing a directory. The directory stores the programming for all user configured aspects of the system. In addition, the directory contains copies of the programs of all user configured aspects of the individual stations coupled to the system. Upon initial power up, the library card downloads the directory information onto the Xbus 23. Each controller reads the program data from the Xbus 23 for each of the systems it controls. As will be discussed in more detail below, each controller contains a copy of the directory so that if power is lost, that information can be uploaded to the library card at power up.

Each successive shelf added to the system is coupled to the power bus 21, clock bus 22 and Xbus 23, eliminating the need to provide an additional library/clock 10 or administrative controller for each new shelf. In the preferred embodiment of the present invention, the administrative controller supports 24 individual controllers, up to 18 of which can be station controllers and up to 6 of which can be analog controllers. In this manner, 8 to 144 digital phones and 8–48 analog devices can be utilized with the present invention.

The controllers provide the distributed control function of the present invention. Each controller is physically identical to every other controller. The function of each controller depends on the system software loaded into the controller by the administrative controller from the library clock card 10. Each controller functions as a "mini-switch" for 8 ports which may be digital or analog depending upon the instructions loaded into the controller from the library card, and the location of the controller in the shelf. In the preferred embodiment of the present invention, six of these controllers (block 12) are coupled to digital station interface 24. This interface provides a means to couple the controllers to such devices as digital telephones for voice and data transmission purposes. Also in the preferred embodiment, two controllers (controller C6 and C7 of block 13) are coupled to analog device interfaces 25 through 28 to couple the system to outside facilities such as trunks, tie-lines, off-premises stations, etc.

Figure 12:
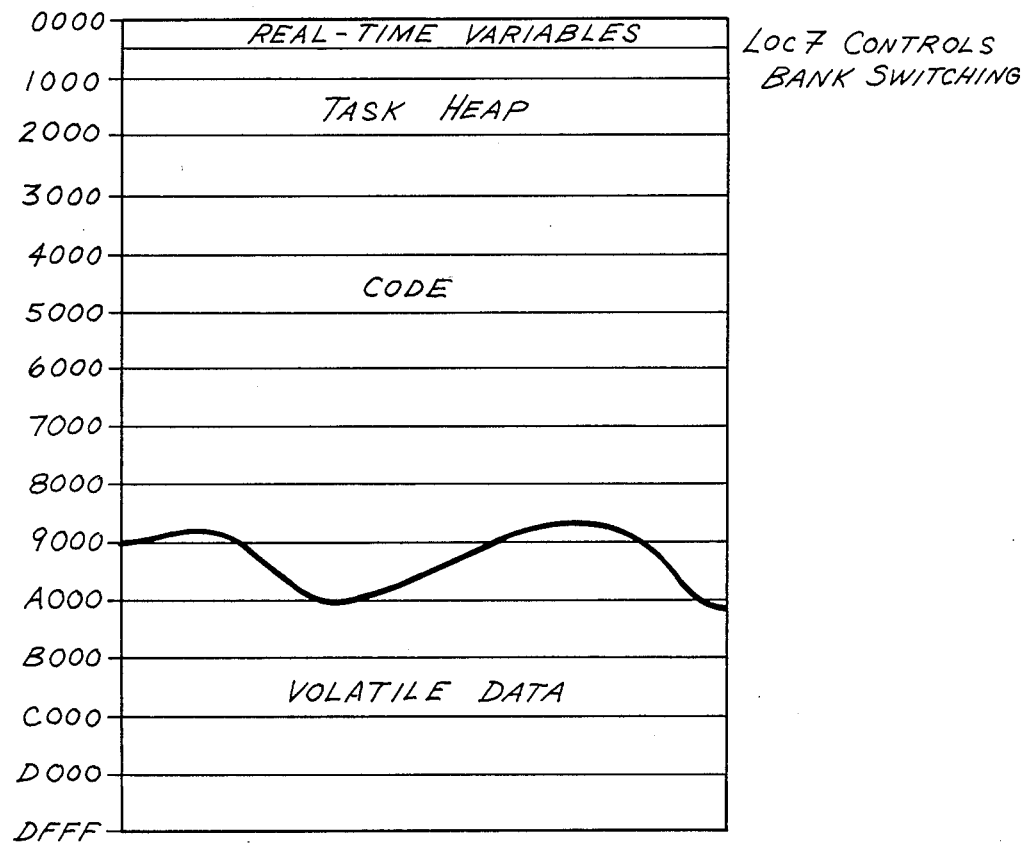
FIG. 12 is a General Memory Map of the present invention.
Figure 12:
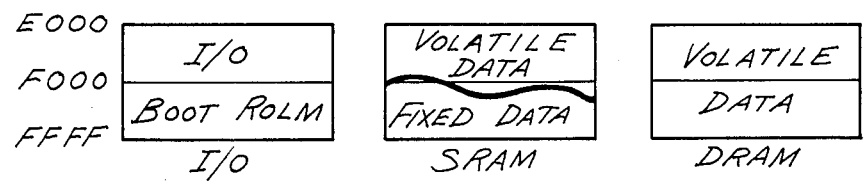

The general memory map for each controller is illustrated in FIG. 12. The lower part of the memory, labeled real time variables, is used by the real time system of the present invention. Next, the task key contains all control structures for the multi-tasking system which will be described in more detail below. The remainder of the memory is comprised of code and volatile data. The wavey line separating these two areas indicates that the relative amount of code in volitile data may vary.

Figure 13:
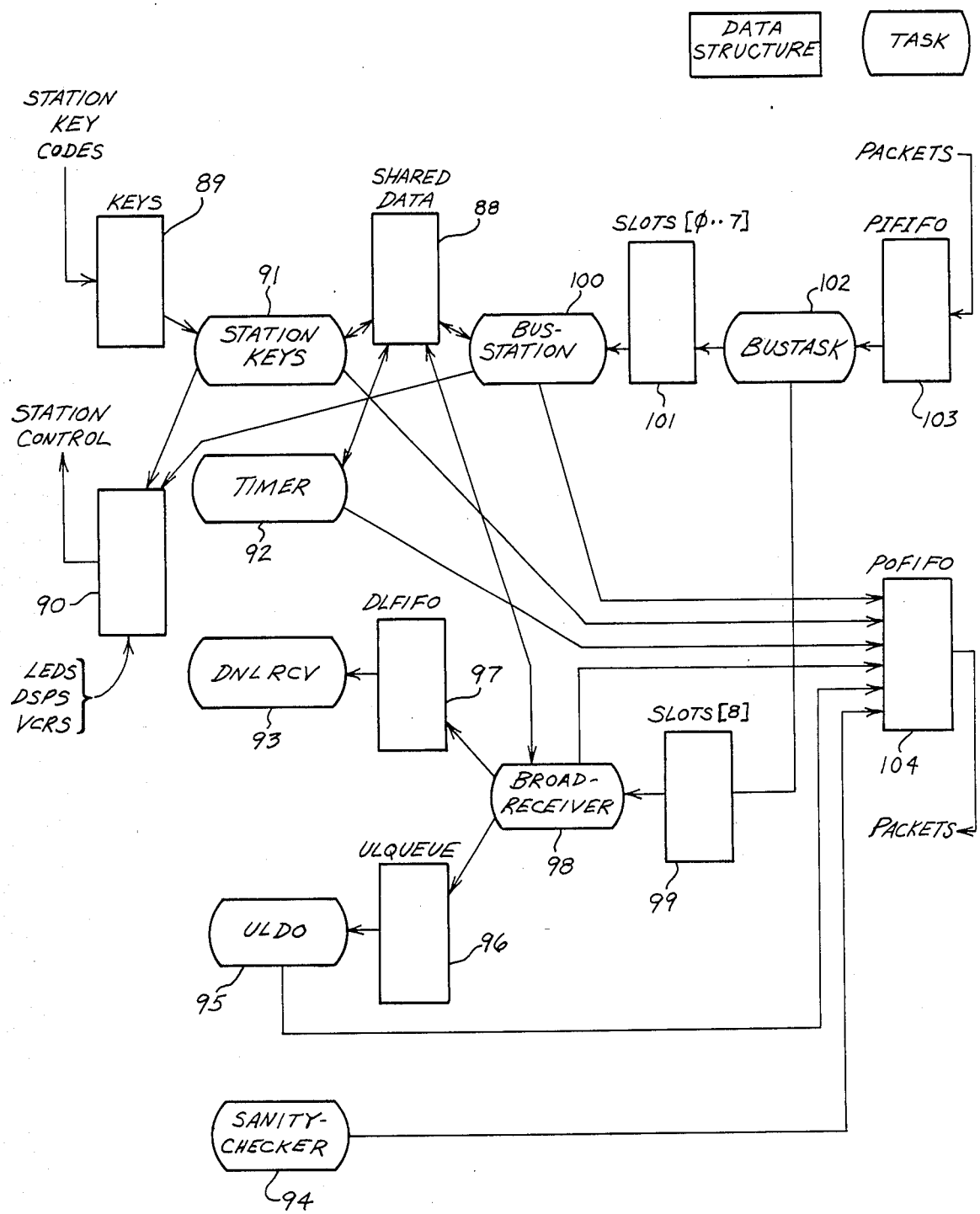
FIG. 13 is a flow diagram illustrating the software struction and information flow of the present invention.

The software structure for a digital station is illustrated in FIG. 13. Both of the data structures are FIFOs and are represented by rectangles. The remaining blocks show the independent tasks performed by the software. The shared data block 88 is not a FIFO and is used for pascal variable, arrays, scalers, etc. as well as fixed data like directories and system parameters.

Two tasks are running per station. The first one, STATIONKEYS 91 is waiting for key strokes from keys 89. The second task, BUSSTATION 100 is monitoring for bus packets. (These packets from this or any other controller.) The two tasks communicate with each other through the data structures and either task can change the following station controls 90 including packets. The rotary pointer moves around QUEUE to locate the data in and data out so there is no physical data movement.

SOFTWARE/HARDWARE INTERFACE ROUTINES

A list of the Software/Hardware Interface Routines and the name of the structure they access is found below.

|  | STRUCTURE USED |
|---|---|
| 1. ALL CONTROLLERS | |
| a. SETLATCH (MASK, DATUM:BYTE) | controller latch |
| b. GETPACKET (VAR P:PACKET) | PIFIFO |
| c. PUTPACKET (VAR P:PACKET) | POFIFO |
| 2. DIGITAL AND ANALOG CONTROLLERS | |
| a. DOAUDIO (S:STATIONS, PORT:INTEGER) | SE code or IEOFIFO |
| b. SETVOL (S:STATIONS, COEFF:BYTE) | SE code |
| 3. DIGITAL CONTROLLERS | |
| a. READKEY (S:STATIONS; VAR K:KEY) | KEYS |
| b. DOLIGHT (S:STATIONS; K:KEY; L LIGHTPATTERN) | LEDS |
| c. WRITEADDRESS (S:STATIONS; . . .) | DSPS |
| d. WRITECHAR (S:STATIONS; DATUM:BYTE) | DSPS |
| e. SETVCR (S:STATIONS, MASK, DATUM:BYTE) | VCRS |
| f. VOICEOVER (S:STATIONS; PORT:INTEGER; O:OPTION) | SE code or IEOFIFO |
| 4. ANALOG CONTROLLERS | |
| a. READTRUNK (T:TRUNK; VAR K:KEY) | MFTM |
| b. WRITETRUNK (T:TRUNK; K:KEY) | MTTM |
| c. SETTRUNK (T:TRUNK; . . .) | TCBTAB |
| d. SETTIE (T:TRUNK; . . .) | TCBTAB |
| 5. CONFERENCER AND ADMINISTRATIVE CONTROLLERS | |
| a. SETCONF (CONFER, CONFEE:BYTE, PORT:INTEGER) | SE code |

LED control, displays or voice control register.

BUSTASK 102 is a distributor responsible for keeping the PIFIFO (packet in FIFO) empty and routing the packets to slot 0-7, shown as slots 101, which communicate with the BUSSTATION 100 tasks, or slot 8, shown as block 99, which communicates with the broadcast receiver 98. The broadcast receiver 98 either operates on its own or passes the packets onto the down load receiver (DLFIFO) 97 or the up load task 96 (ULQUEUE). The sanity checker 94 is a background error checker which notes discrepancies on the controller. If it finds a bad status, it sends a packet to the administrator to restart the controller in order to clear the problem. POFIFO (packet out FIFO) 104 is used to distribute packets to other controllers. The timer 92 controls the timing related to stations. For example time outs may occur when some operations do not get completed in time.

There are two inputs to the controller software, station key codes from keys 89 and packets from PIFIFO 103. There are also to outputs, station control 90 and packets out through POFIFO 104. These boundaries define the limits of the functional code in the present invention.

Figure 14:
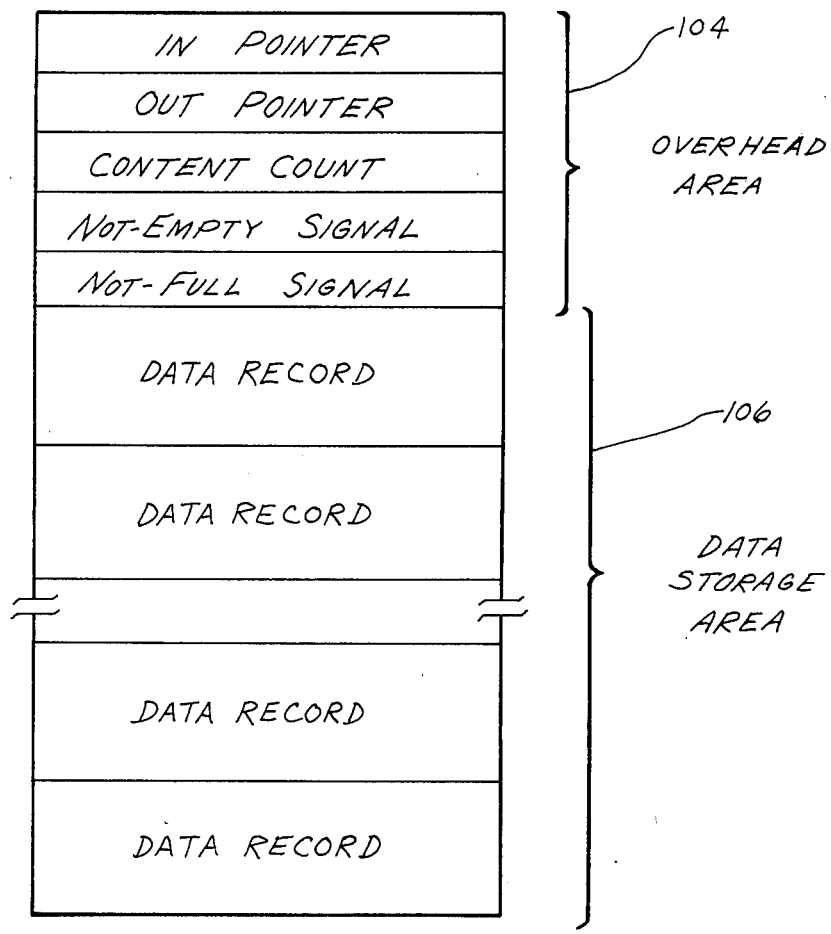
FIG. 14 illustrates the FIFO format of the present invention.

The standard form for the FIFOs of the present invention is illustrated in FIG. 14. There is a fixed overhead area 105 including an IN POINTER which is used to point to where the next data is written. OUT POINTER points to where the next data is read. CONTENT COUNT records the number of elemets having data in them. NOT-EMPTY SIGNAL shows that the FIFO is not empty and NOT-FULL SIGNAL shows that the FIFO is not full. The data storage area 106 is of variable link and can hold records of various links. For example, a data record could be as small as 1 byte, e.g., key codes from a station, or 10 bytes, in the case of

ALL CONTROLLERS

SETLATCH is used to selectively set and reset individual bits within the latch. It is not necessary to know what the other bits are. Mask functions is a bit clear, and datum functions as a bit set. GETPACKET is used to retrieve packets from the PIFIFO. PUTPACKET is used to put packets into the POFIFO.

DIGITAL AND ANALOG CONTROLLERS

DOAUDIO is used to tell the controller to set up this particular port as a sound source. SETVOL is used to control the channels with volume control. This includes some trunks and all stations. There is a volume coefficient for gain and loss applied to the audio signal.

DIGITAL CONTROLLERS

READKEY reads the key stroke, if available. DOLIGHT is used to set the station LED with a light pattern. WRITEADDRESS is used to send strings of display information to a station capable of displaying such information such as a ROLM phone 400. WRITECHAR is used to send character display information to phones such as ROLM phone 400. SETVCR sets the voice control register and VOICEOVER is a specialized routine for a given station related to a voice override feature.

ANALOG CONTROLLERS

The routines for the analog controllers do not communicate to the trunks themselves, but to a trunk monitor. READTRUNK is similar to READKEY and reads the trunk monitor. WRITETRUNK sends commands to the trunk monitor software. SETTRUNK and SETTIE are used for initialization.

CONFERENCER AND ADMINISTRATIVE CONTROLLERS

SETCONF is used like voice over to set up a conferencer for conference calls.

XBUS

In operation, each controller communicates with other controllers through the Xbus 23. A controller places addresses on the Xbus 23 of controllers with which it wishes to communicate. The controllers in turn place data on the Xbus which is read by the first controller. Ultimately, the communication is between ports serviced by each controller.

Through the clock bus 22, the Xbus 23 is divided into a plurality of time slots. In order to eliminate the need for a central clearing house for communications between controllers, each controller is assigned certain time slots during which it has access to the Xbus 23.

Figure 4:
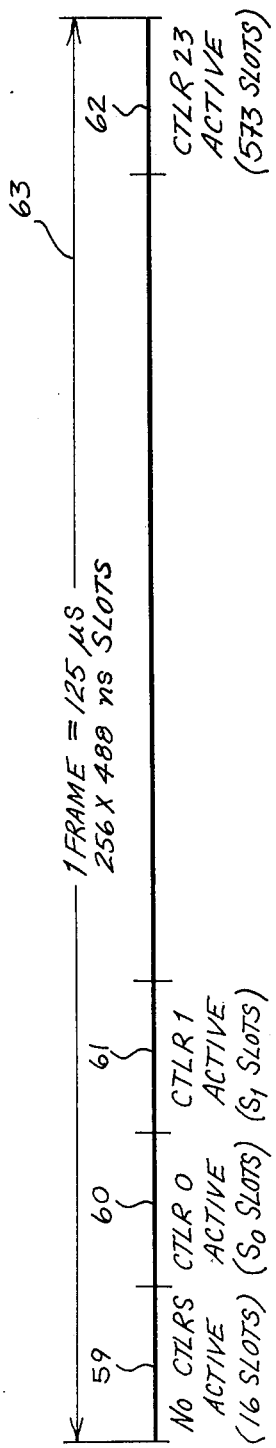
FIG. 4 is a graph showing the time division of the present invention.
Figure 4:
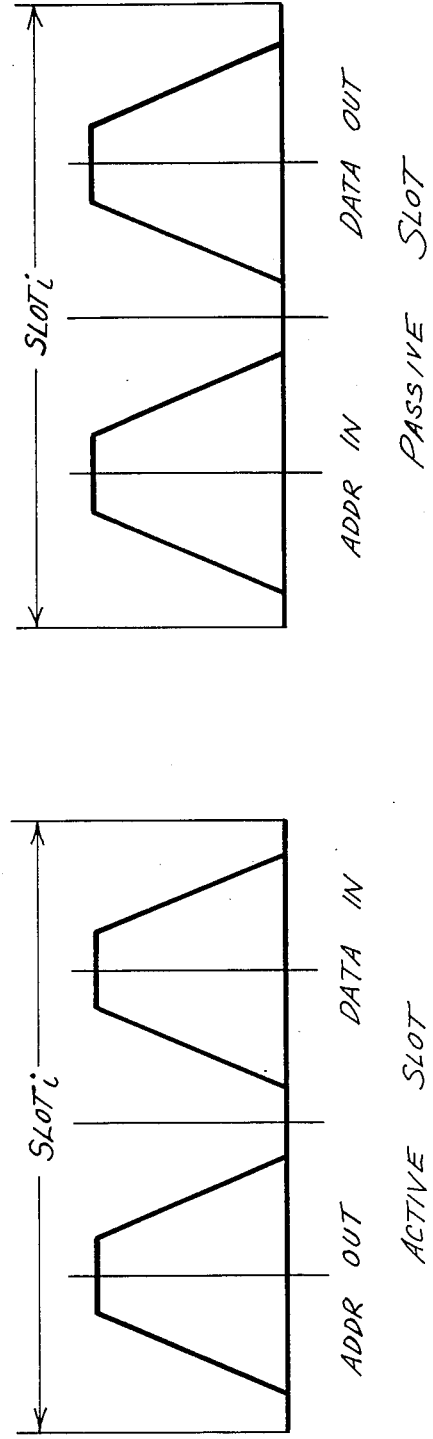

The time division of the Xbus 23 is shown in detail in FIG. 4. Time on the Xbus 23 is arranged in a plurality of "frames," a frame being 125 microseconds in the preferred embodiment. Each frame gathers one byte. Each frame is further subdivided into 256 "slots," a slot being approximately 488 nanoseconds. Sixteen of these slots are used each frame to synchronize the Xbus 23 and the controllers C0 through C23. The remaining 240 slots are divided among the 24 controllers for their use in sending and receiving data packets. The controllers send control messages over 8 frames (1 millisecond) which is defined in the present invention as a "superframe."

Referring back to FIG. 1, each controller communicates with other controllers in a round robin fashion as follows. Once each millisecond, (superframe), a controller reads a data packet from another distinct controller. Each controller transmits its information packet each millisecond for 32 milliseconds, to guarantee communication to all other controllers. As a result of this system, a maximum of 32 milliseconds is required for a given controller to communicate with all other controllers. As noted, each frame has 256 time slots of 488 nanosecond duration. 16 slots are allocated for synchronization, leaving 240 time slots in each frame. In the preferred embodiment the slots are divided equally among the controllers, giving each controller 10 active time slots per frame. During all but these 10 slots per frame time, a controller is passive.

The ten active time slots for each controller are arranged in the preferred embodiment as follows. Time slot 0 (of the 10 assigned time slots) carries an ICP (Inter Controller Packet) which is used to broadcast control messages to all controllers. Time slot contains RS-232 data and is used only by the administrative and maintenance controllers. No other controllers use this slot. Time slots 2-9 contain station voice data for digital controllers, for reading station voice data to another station. Analog controllers utilize slots 2-9 for reading trunk voice data to another trunk. Administrative and conferencer controllers utilize time slots 2-9 for conference information to input 2-4 way voice summers to allow conference calling.

The Xbus 23 can be thought of as a "read only" bus. The active event on the bus is reading and the passive event is generating data. An active controller is defined as the controller putting an address of a particular passive controller onto the Xbus in which it wishes to communicate with. The passive controller will detect its own address and respond by putting a byte of data for the active controller onto the Xbus 23. The active controller will, in turn, read this byte of data into its storage. Therefore, from the viewpoint of the active controller for a particular time slot, its function is to put an address out and read data in. From the viewpoint of the passive controller, its function is to read an address in and put data out. Therefore, every time slot (or four hundred eighty-eight nanoseconds), one byte of information is read by the active controller. The four events, address out, address in, data out, and data in are controlled by the eight MHz clock rate which is the underlying clock rate for the entire system.

In order to control the division and distribution of time slots, along with each controller, there are three registers to keep various time slot counts.

1. Time Slot Base—this register contains the exact time slot in which a controller will become active. For instance, controller C0, will contain zero in its time slot base while controller C1 will contain ten in its time slot base.

2. Time Slot Count—this counter keeps a count will be incremented and the register will be reset every 125 microseconds (256 time slots).

3. Local Time Slot Count—this register contains the assigned number of time slots allocated to a particular controller.

The system works in the following way. The time slot count register for all controllers is incremented by one for each time slot. After two hundred and fifty six time slots have been counted, all controllers reset their time slot count register to zero and start counting all over again. When the time slot count register for a particular controller matches the number stored in the same controller's time slot base register, that controller will have sole access to the Xbus for a given number of time slots. This an active controller. The number of time slots is stored in the local time slot count register of the controller. An address will be output and a byte of data will be received for the number of counts contained in the local time slot count register.

The Xbus system itself consists of nine lines. Eight of the nine are multiplexed between data and address transactions. With nine lines used for addressing, up to 512 separate ports can be addressed. Each controller is assigned 16 ports.

The operation of the Xbus 23 may be better understood by referring to communications between telephones serviced by different controllers. For example, controller C0 services eight digital ports through a digital interface 24. These ports may be coupled to digital phones. When controller C0 is passive, it reads addresses from the Xbus 23 during the first half of each passive time slot. These addresses are placed on the Xbus 23 by the controller which happens to be active during that time slot. If the address on the Xbus during the first half of a passive time slot does not correspond to any of the ports serviced by controller C0, C0 ignores the address and continues reading addresses from the Xbus 23. If the address on the Xbus corresponds to one of the ports serviced by controller C0, data from that port is placed on the Xbus 23 during the second half of that time slot. This data is taken from the Xbus 23 by the active controller which had placed the address on the Xbus 23 during that particular time slot.

During the time slots which have been assigned to it, controller C0 becomes active. When controller C0 is active, it uses 8 of its 10 assigned time slots to service its 8 digital ports, one time slot per port. Two of the assigned time slots are used for administrative communication with other controllers. For purposes of discussion, we will assume that during the first time slot assigned to controller C0, it services port P0. During the first half of this active time slot, controller C0 outputs the address of the port with which port P0 wishes to communicate, for example, port P7 of controller C7. Controller C7, which is currently passive, is therefore reading addresses from the Xbus 23. Controller C7 recognizes the address of its port P7. Thus, during the second half of this time slot, controller C7 outputs onto the Xbus 23 data generated by its port P7. Controller C0 then takes this data from the Xbus 23, providing it to port P0.

In communications, an active controller places a 9 bit Correspondent Address (CA) on the Xbus 23. The upper 5 bits identify the particular controller and the lower 4 bits identify the particular port or channel on that controller. Unless the upper 5 digits match a controllers address, it is unable to enable the output and place data on the Xbus.

In summary, a passive controller continuously monitors the Xbus 23, reading addresses placed on the bus by active controllers. When a passive controller reads an address corresponding to a port serviced by the controller, it places data on the Xbus, said data being read by the controller outputting the address. An active controller, during its assigned time slots, outputs an address on the Xbus of a port of a controller with which it wishes to communicate. During the second half of each active time slot, an active controller reads data placed on the Xbus 23 by a passive controller addressed by the active controller. Although the above discussion refers to the digital ports serviced by a controller, it has equal application to the analog interface serviced by the controllers.

Although in the current preferred embodiment, the time slot allocation is fixed, it is possible to dynamically allocate the time slots. When using dynamic time slot allocation, the same time slot may be allocated to various controllers without changing the basic address which refers to that time slot. Unassigned time slots are combined in this preferred embodiment of the present invention into blocks (typically 16 time slots per block) which are made available to the controllers as needed. In order to obtain these unused blocks, a controller will monitor the Xbus 23 to determine if any of these time slot blocks are free. However, a block appearing free only means that the block was free sometime within the last 32 milliseconds. A controller will send out a message to the other controllers indicating that it would like to use the free block of time slots. The controller then waits for an approval message from each of the other controller and if each says yes, the controller marks the free time slot block as its own and begins using it. If one of the controllers does not approve of the takeover of the time slot block, that indicates that the time slot block may not be free. If, while requesting the time slot block, the controller either does not receive an acknowledgment or receives a request for that time slot block from another controller, the first controller will stop asking for the time slot block, wait a random time, and then search for a new free time slot block.

In the preferred embodiment of the present invention, communication between controllers takes place in standard units of information known as packets. The packets are eight bytes long and take one superframe to transmit. The packets are divided into four fields. The destination fields includes the shelf ID and controller ID of a controller to receive the packet. A second field, known as the sender field contains the address information of the sending controller in the same format as the destination field. A third field is a command field and contains the information to be given to the desrination controller (i.e., what it is the destination controller is to do). A fourth field, the reference field, is command dependent. It is used for general information if the command needs a descriptive part. The reference field may include a CALLINDEX to identify the specific station with which communication is sought. The reference field also includes CALLID to identify a specific key or light at the desired station.

CONTROLLER

Figure 2:
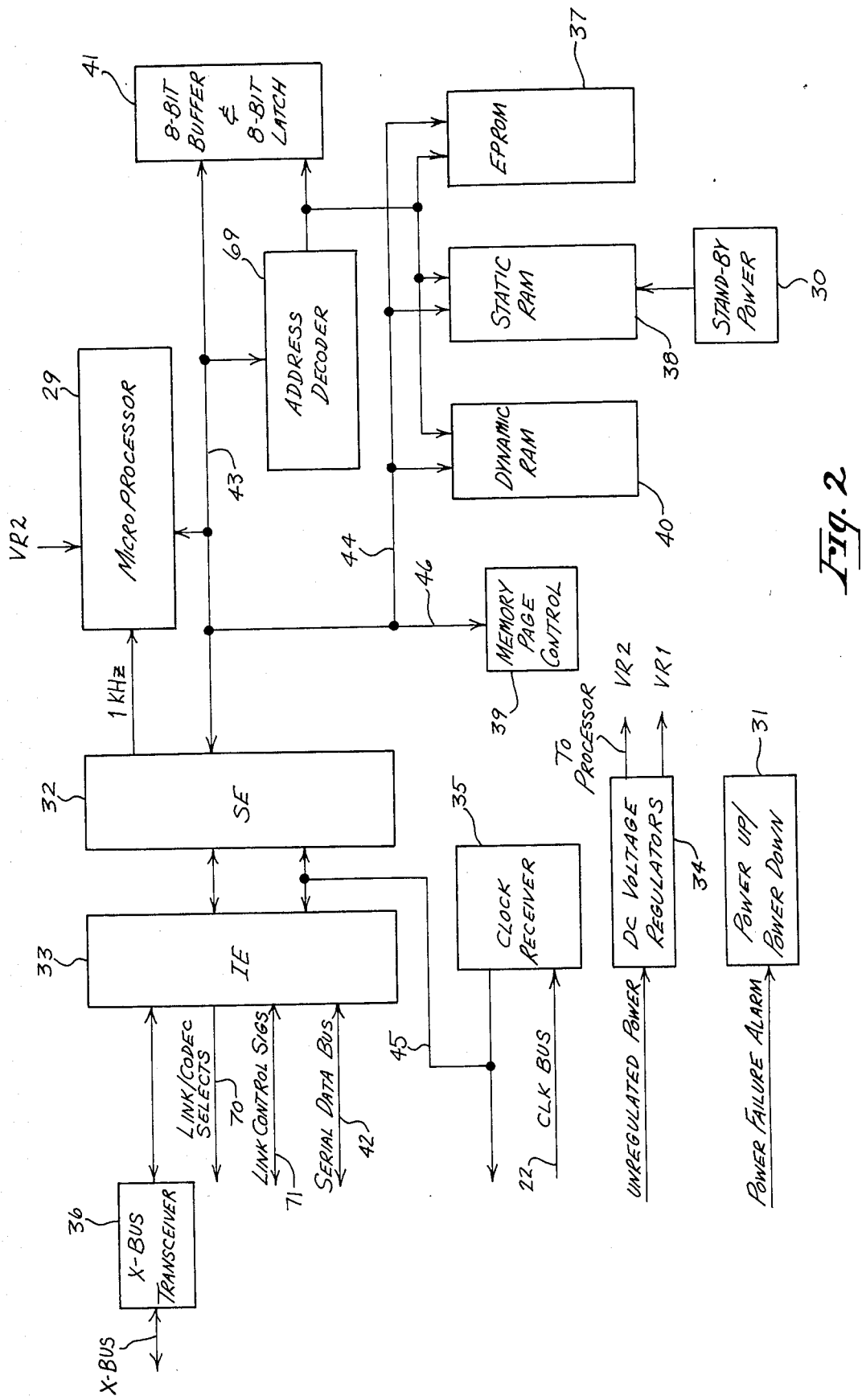
FIG. 2 is a block diagram illustrating a controller of the present invention.

The controller provides a means of controlling communication between the Xbus 23 and the digital stations or analog interfaces to which each controller is coupled. Each controller provides storage for incoming and outgoing data as well as switching services for the individual lines coupled to each controller. The controllers are shown in more detail in FIG. 2. Each controller includes a buffer and latch 41 coupled through line 43 to microprocessor 29. The processor 29 is coupled through an address decoder 69 to buffer 41 and to a memory consisting of dynamic RAM 40, static RAM 38, and EPROM 37. The processor 29 is also coupled through line 46 to a memory page control 39. The processor 29 is coupled through line 44 directly to the dynamic RAM 40, static RAM 38, and eprom 37. Coupled to the static RAM 38, is a standby power block 30 which provides battery backup during power failure. The clock receiver is coupled to the clock bus 22, switching element 32 and interface element 33. Power is supplied through a DC voltage regulator 34 and a power up/down circuit 31 provided on each controller sequences the activation and deactivation of the microprocessor 29, the SE 32, and the static RAM 38. The switching element 32 is coupled to th interface element 33. The interface element is coupled to the Xbus 23 through a transceiver 36. The interface element 33 is also coupled to digital station interfaces and to analog device interfaces through serial data bus 42, link/codec select line 70, and link control signal line 71.

Each controller contains its own processor 29, which in the preferred embodiment is a 6809 microprocessor. Each controller includes voltage regulators 34 which provide +5 volt and -5 volt regulated voltages to the components on the controller as well as controlled by the controller. Clock receiver 35 receives 3 to the interfaces clocking signals on the clock bus 22, a master frequency signal at 8.192 MHz, a superframe signal at 1 KHz and a 512 KHz interrupt clocking signal. The clock receiver 35 reclocks these signals, and supplies clock signals to the various components of the controller and to the various interfaces.

The processor 29 is coupled through line 43 to the switching element 32 and through line 46 to the memory page control 39. Through line 44, the processor is coupled to ROM 37, static RAM 38 and dynamic RAM 40. The processor 29 in the preferred embodiment operates at 2.048 MHz from a program stored in the RAM 38. The 2.048 MHz clock signal is generated by the switching element 32 and supplied to the processor 29 on line 43. By dedicating a processor to each controller, the switching netork of the present invention allows for greater flexibility than prior art switching networks. As the system is upgraded, more control capacity, in the form of processors, is provided. Each processor is dedicated to 8 ports, which can be coupled to digital telephones or analog devices.

Each controller contains an entire copy of the directory stored in the static RAM 38. Upon power up of the system, the library card downloads the directory information into the static RAM of each controller. Standby power is coupled to each static RAM to preserve directory information during power failures or maintenance on the library card. During a power up, each controller requests service from the system administrator. The system administrator then takes the directory information from each individual controller and uploads it to the library card so that the system again has multiple copies of the directory software. This minimizes the chance for a signal point failure. Individual controllers can be removed from the system as well without suffering a loss of directory information. As soon as a controller is placed into the system, a decision is made to download directory information to the static RAM 38 of the individual controller.

A battery 30 coupled to RAM 38, provides power to the static RAM 38 in the event of a power failure. During normal operation, the voltage source 34 supplies 5 volts to the RAM 38. When the input voltage falls below approximately 3.5 volts, the battery is coupled to the RAM 38 and supplies 3.5 volts. In the preferred embodiment, the battery 30 is located in a central location in the system. However, a battery may be provided on each controller card, if desired.

The ROM 37 is a 4k by 8 memory which stores initialization code for the controller. The ROM addresses are located in the processor memory space. When the processor 29 is powered up, it immediately executes the code stored in ROM 37, runs a diagnostic test on memory, and goes into a loop, awaiting download of instructions from the administrative controller 11. An EPROM may replace the ROM 37.

The Xbus transceiver 36 is used to transmit signals bidirectionally between the Xbus and the interface element 33.

The address decoder 69 supplies chip select signals for the memory and the buffer/latch 41. The address decoder 69 is coupled to the processor 29.

The buffer 41 provides an 8 bit signal to the processor. Six of these bits are used to define card addresses and shelf addresses. One bit is a power-down signal which is generated by the power-down circuit 31 in the event of a power failure, and the remaining bit is unused. The input buffer 41 is read by the microprocessor 29 once every millisecond (superframe).

Figure 3:
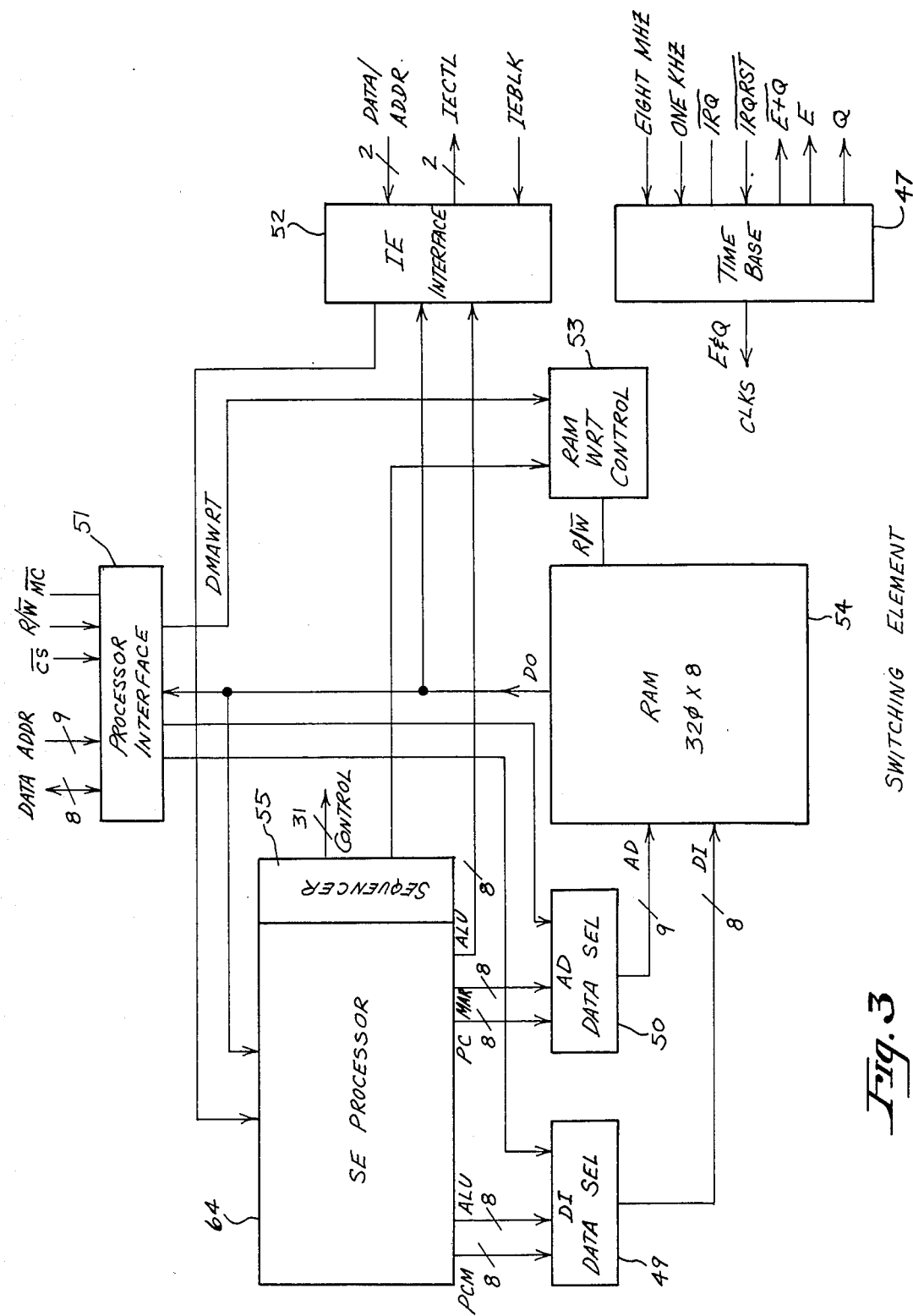
FIG. 3 is a block diagram illustrating a switching element of the present invention.

The switching element 32 (described in detail in conjunction with FIG. 3) generates clock signals and interrupt signals and provides switching services. The interface element 33 acts as a storage space which is accessible by the switching element 32, the Xbus 23 and the individual lines serviced by the controller.

The heart of the controller operation is the SEP (switching element processor) 64. The cycle time for the SEP is 244 nanoseconds in the preferred embodiment. Instructions are 2, 4 or 6 cycles long. The SEP 64 is coupled to the processor interface 51 and, through the interface element, tc the link/codec interface 58 and the Xbus interface 57. These three interfaces each provide a double buffering mechanism for data in and data out between the SEP 64 and the outside world. The purpose of the double buffering scheme is to allow the SEP 64 to process data contained in one buffer, while at the same time the input output mechanism for the 6809 processor 29, Xbus 23 or link/codec, can process data in the other buffer.

The double buffering works in the following way. Each interface has two buffers, Buffer A and Buffer B which are exactly the same dimensions for a particular interface. The SEP 64 can input data and output data from one of the buffers in the I/0 mechanisms and can also input and output data from the other buffer. After 125 microseconds, (one frame) the buffers are switched and the SEP 64 and I/O mechanisms will process data in the other buffer. After another 125 microseconds the buffers will be switched again and so forth. The concept here is to have the SEP refreshed datain one of the buffers, switch buffers have the I/O mechanisms process data and repeat. As previously noted, the 6809 processor 29, accesses the switching element buffer space 54 at a superframe rate (one millisecond).

The I/O mechanism is block of sequential logic unique to each of the interfaces. The function of this logic is to move data into and out of either of the buffers, A or B from the Xbus, 6809 processor 29, or link-/codec. At a given point in time, the logic will input data from an interface card to Buffer B and output data from Buffer B to the interface card. At the same time, the SEP 64 will be processing data in Buffer A, relaying data from that buffer into Buffer A in one of the other two interfaces (processor 29, Xbus 23 or link/codec) and vice versa. This processing in the SEP 64 continues for one frame. At this time, the sequential logic and the SEP 64 switch buffers. The sequential logic works on Buffer A and the SEP 64 works on Buffer B. The switch occurs again every frame. For example, at frame F(1) a voice sample is stored in Xbus Buffer 73 by the sequential logic while the SEP 64 is working on the previous voice sample in Buffer 73A. At Frame F(2) the voice sample is processed by the SEP 64 and stored in the link/codec Buffer 72B while the sequential logic works on tht next incoming voice sample in Buffer 72A. In Frame F(3) the voice sample being traced is sent to the link/codec interface card by the sequential logic in Xbus Buffer 73B while the SEP 64 processes the next voice sample in Xbus Buffer 73A. At given point in time, Buffer A and all three interface buffering schemes will be in the hands of the sequential logic blocks while Buffer B in all three will be accessed by the SEP 64.

XBUS BUFFER

The Xbus buffer to the SEP 64 consists of two buffers, 73A and 73B. Each buffer has an input and output portion each containing 16 bytes in the preferred embodiment. The Xbus buffer also has 16 corresponding address locations consisting of two bytes for each location. The corresponding addresses will be stored in the corresponding address location. The address is made up of the controller ID and port number of the controller. The upper five bits of the nine bit address identifies the controller (0-31) and the lower four bits identifies the port numbers for the particular controller (0-15). Each corresponding address represents the controller/port number in which a byte of data will be received from and put into the Xbus input port.

LINK/CODEC BUFFER

The link/codec interface consists of a double buffering scheme, Buffer 72A and 72B, similar to the Xbus buffer. Each buffer has an input and output portion containing 32 bytes each. The input portion stores information which is ready to be transmitted to the digital or analog card. The output portion contains information which has been received from the digital or analog card. Each cell of the buffer consists of a 32 bit segment, called a "link frame."

The first 16 bits of the cell contains information for data switching or voice information pertaining to the analog devices. This area of information is multiplexed depending whether the device connected to this interface is an analog device or data switching device. If the current controller is interfacing to an analog device, the 8 bit voice samples to the analog device will be stored into the high order 8 bits of the link frame. If the current controller happens to be a station interface, the 8 bit data control samples will be stored into the high order 8 bits of the link frame.

The next 8 bits store voice information for the digital lengths. The next 4 bits contain link control information (keyboard, display, etc.) and the last 4 bits contain four parity bits for the four previous fields.

A link frame is transmitted down link and received up link every frame. Therefore, transmission is at a rate of 256 KHz.

The sequential logic processes information from the digital or analog card to one of the link/codec Buffers 72A or 72B. At the same time, the SEP 64 is processing information in the other buffer of the link/codec buffer and distributing the data to the processor 29 or the Xbus buffer. Every frame, the two mechanisms switch buffers and start processing the next block of data.

The main function of the sequential logic is to fill th output portion of the buffer with an link frame from each link and to output a voice frame to each of the links from the input links of the buffer. This function must be completed for every channel every frame.

The main function of SEP 64 and the link/codec buffer is to disassemble the output link frames into subchannels and send this subchannel information to either the 6809 processor 29 buffer or the Xbus 23 buffer. Plus, the SEP 64 will take subchannel information from the Xbus buffer and processor 29 buffer and assemble the subchannel information into the link frames for the link/codec input buffering period. A link frame is separated into subchannels in the following way The first byte of the link frame (data control) is subchannel 0. The second byte is subchannel one (data). The third byte is subchannel two (voice) and the fourth byte is subchannel three (link control and sync). The SEP 64 with swap voice subchannel information with the Xbus interface. Voice subchannel information from the output portion of the link/codec buffer 72 is transferred to the output portion of the Xbus buffer. Xbus voice information from the input portion is transferred to the input portion of the link/codec buffer 72.

Subchannel three information (link control/sync) is swapped with the 6809 buffer in the same manner. Subchannel three information contains control information to be processed by the 6809.

PROCESSOR BUFFER 54 (SUPERFRAME) BUFFER

The processor buffer consists of a double buffering scheme which is similar to the link/codec buffer and Xbus buffer. The buffer consists of two buffers 54A and 54B with each having an input portion and an output portion. These buffers are memory mapped into the address space of the processor 29 so that the real time code has access to one of the buffers at a particular time while the SEP 64 will process information in the other buffer. The processor 29 access and SEP 64 switch buffers every millisecond (superframe). This means that every 125 microseconds only one byte of link control information and one byte of intercontroller information is swapped. A total of one millisecond is needed to fill the link packet input buffer and intercontroller packet input buffer.

Each buffer 54A and 54B consists of two 8 byte link packets (one for input and one for output). Each packet consists of subchannel three of the voice frame (link control subchannel). Therefore, the link packet contains 8 bytes of control sync information to or from a ROM phone link. Actually, only the upper nibble of the control/sync byte is used to form the ROM phone commands. The lower nibble consists of parity and is discarded. A ROM phone link command consists of 32 bits or one superframe of information (2 quad frames) four bits from each of the 8 bytes will form the 32 bit ROM phone command.

The 8 byte intercontroller packet consists of an 8 byte packet used for intercontroller communications. The 8 byte field names are as follows:
1. Destination CALLINDEX
2. Destination CALLID
3. Sender CALLINDEX
4. Sender CALLID
5. Command
6. Reference CALLINDEX (byte 1)
7. Reference CALLINDEX (byte 2)
8. Reference CALLID Intercommunication packets are passed between controllers as a way to pass data and status information to each other via the Xbus 23. The SEP 64 will move a byte of packet information from the intercontroller input port to the processor 29 intercontroller input buffer and from the intercontroller output buffer to the intercontroller output port every frame.

SE/IE OVERVIEW

Figure 9:
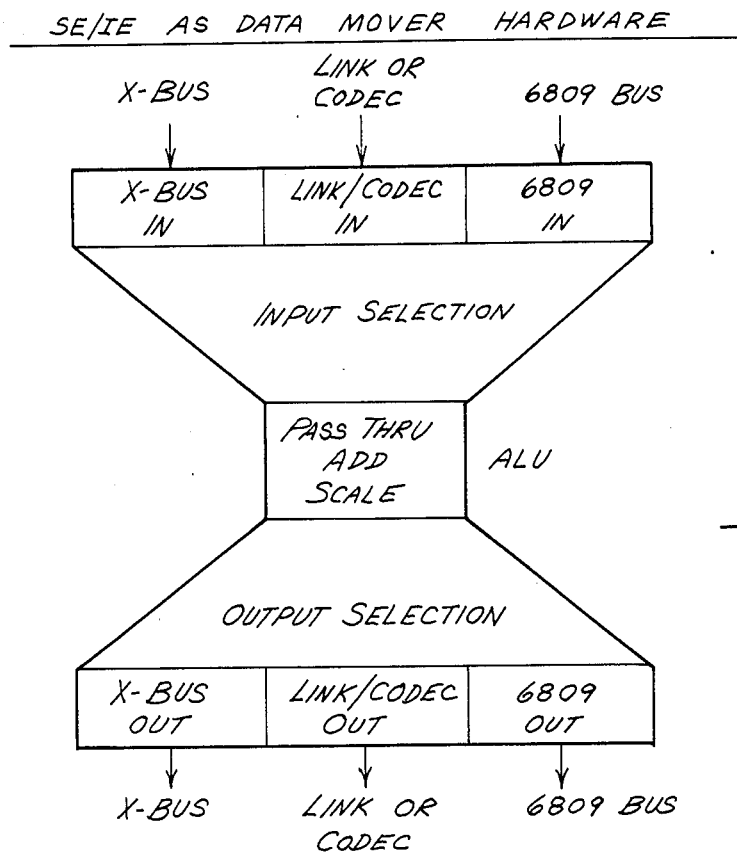
FIG. 9 is a block diagram illustrating the operation of the SE/IE.

FIG. 9 is a block diagram showing a conceptual model of the SE/IE. SE/IE has three inputs on top and three outputs on the bottom. The outputs are identical and consist of the Xbus, the link/codec and the control processor bus. In the preferred embodiment of the present invention, a 6809 processor is utilized as the control processor The SE/IE can be thought as a arithmetic logic unit (ALU) which selects its inputs and outputs from the double swapping buffers. For example, the input from the link can be added to the input from the 6809 bus and the results can be outputted on the Xbus, or any other combination desired. The logic that captures the data is specific to the type of bus the data is coming in on. The double buffer swaps the data at the frame rate (125 microseconds) for the Xbus and the link/codec and at the superframe (1 millisecond) for the 6809 bus.

Figure 10:
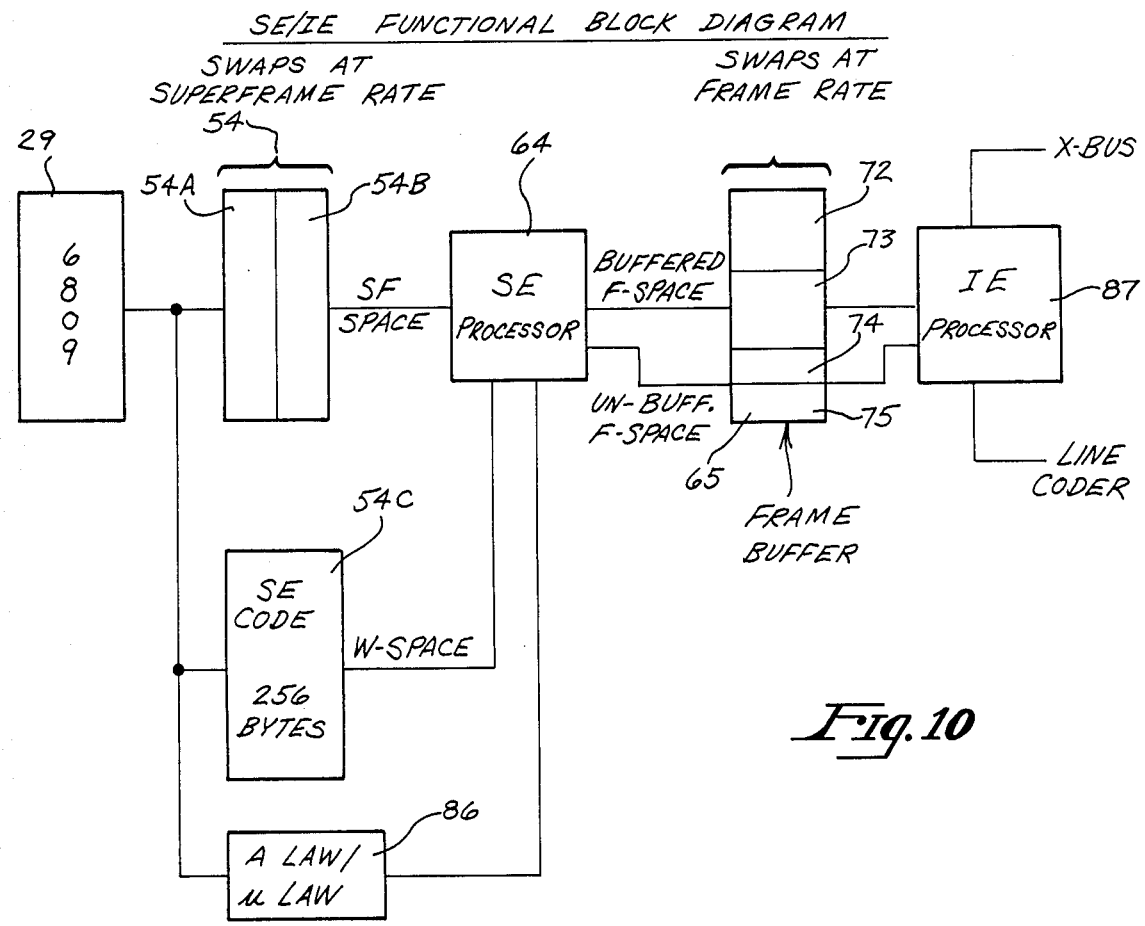
FIG. 10 is a functional block diagram of the SE/IE.

FIG. 10 illustrates a functional block diagram of the SE/IE. As noted above, information from the Xbus 23 and the link/codec lines go in and out of the 6809 processor and are buffered at frame rate in the frame buffer 65. Data from the frame buffer 65 is coupled to the switching element processor 64 and have access to the 6809 processor 29 only through the superframe space 54. The frame buffer 65 includes an unbuffered area 74 for storing correspondent addresses and a special access memory 75 for storing time slot counts, etc. The frame buffer memory 65 is described in greater detail in conjunction with FIG. 7. Working space member 54C contains the switching element code which in the preferred embodiment is 256 bytes. As shown, the 6809 processor 29 dOes not have direct access to the frame buffer space 65 but must first swap data at a superframe rate through buffer 54 and then through the SE processor 64 to the frame space 65.

As noted previously, each controller has 16 ports. Port 0 is for intercontrolled communications and accepts intercontroller packets. All controllers utilize port 0. Port 1 is utilized only by digital controllers for voice override features.

Ports 2-9 are used for voice communication by digital controllers, trunk voice by analog controllers and conferencers by administrative and conference controllers.

Port 10 is utilized for RS-232 data by administrative and maintainance controllers and unused by digital and analog controllers.

Port 11 is a digital milliwatt port used only by the administrative and conference controllers and is used for a standard for measuring gain.

Ports 12, 13, 14 and 15 are special purpose ports for analog and maintenance controllers only. Port 12 is a beep frequency port which in the preferred embodiment is 470.6 MHz. Port 13 is a dial tone frequency, Port 14 is a ring back frequency and Port 15 is a busy frequency.

Figure 15:
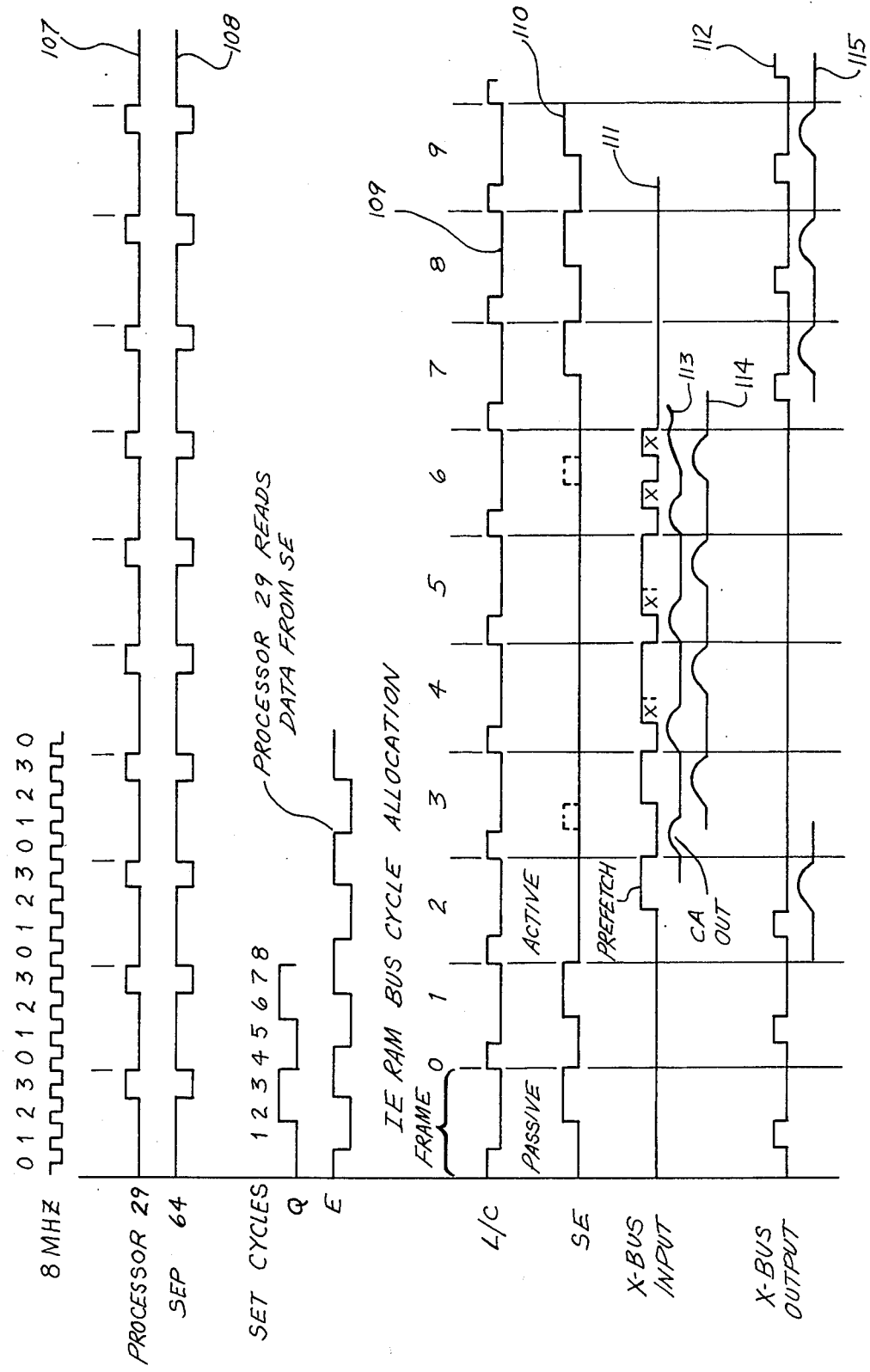
FIG. 15 is a timing diagram of the present invention.

FIG. 15 illustrates a timing a diagram showing the accesses of the various components of the present system to the Xbus 23. As shown by line 107, the processor 29 on each controller has access to the SE/IE memory for one fourth (¼) of each frame while switching element processor 64 accesses the memory for the remaining three fourths (¾) of each frame.

The link/codec accesses the Xbus one fourth of each frame, regardless of the state of the controller, as shown by line 109. As previously noted, each frame is 125 microseconds long. That is the minimum amount of time required to provide clear voice transmission. Therefore, the links/codec buffer must access the Xbus each frame. The switching element, in the passive state accesses the Xbus during the second half of each frame if it has been requested to place data on the bus. When a particular controller is active, the switching element to that controller has no access to the Xbus. Line 111 shows the input to the Xbus for an active controller. In frame 2, the corresponient address of a destination controller is fetched for memory. This address is placed on the Xbus at the beginning of frame 3 (as shown by line 113). During the second half of frame 3, the destination controller places data on the Xbus as shown by line 114. Also in the second half of frame 3, the sending controller is prefetching another correspondent address to be placed on the Xbus. The beginning of frame 4, as shown by the "X" portion of line 111, the data placed on the Xbus by the destination controller in frame 3 is stored by the sending controller.

When a controller is passive, line 112 represents when the RAM is accessible and the controller retrieves data from the RAM. During the passive state, each controller always retrieves data in response to the lower 4 bits of a correspondent address. However, data is only placed on the Xbus by the controller if the upper 5 bits of the correspondent address match that controller's address. Then, as indicated by line 115, the data fetched from the RAM is placed on the Xbus 23.

INTERFACE ELEMENT

The interface element 33 is the means by which the switching element 32 and ultimately, the controller, interfaces with the Xbus 23 and the serial data bus 42 leading to links and trunks. The interface element 33 functions as a RAM which is accessible to three external resources, the switching element 32, the Xbus 23, and the serial data bus 42 (multiplexed links and trunks). The accesses by the Xbus 23 and serial ports occur at a frame rate and are double buffered. The areas of the interface element 33 which are used for storage of data which is being passed between the switching element and either the Xbus 23 or a serial port are double buffered at a one frame rate. Thus, the switching element 32 connects to these locations during th frames that they are not being accessed by the interface element circuitry managing the Xbus 23 and serial port.

The time base 67 generates all of the timing functions used in the interface element, including a 1 MHz clocking signal (superframe frequency) and an 8 KHz signal (frame frequency).

Figure 5:
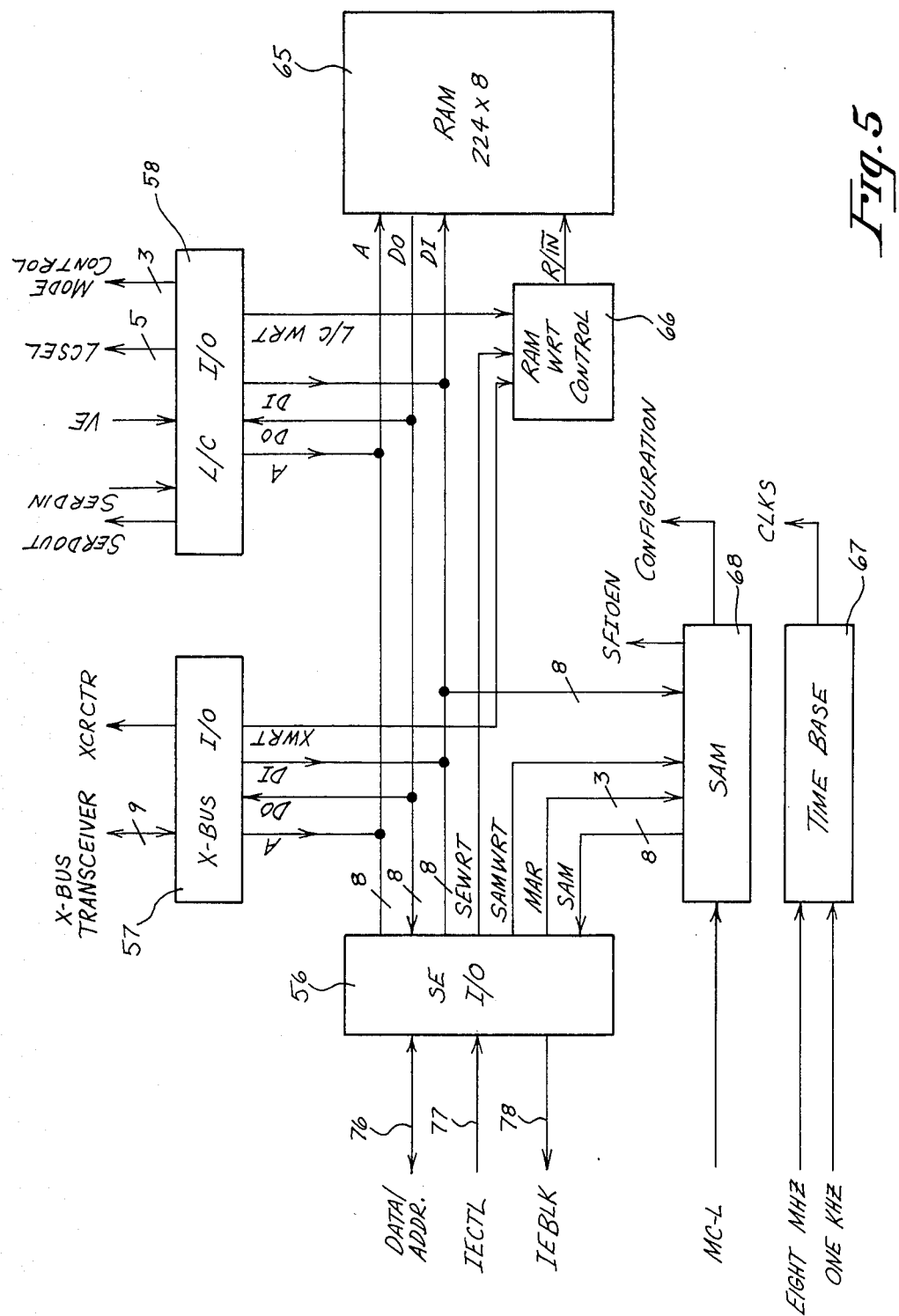
FIG. 5 is a block diagram illustrating an interface element of the present invention.
Figure 7:
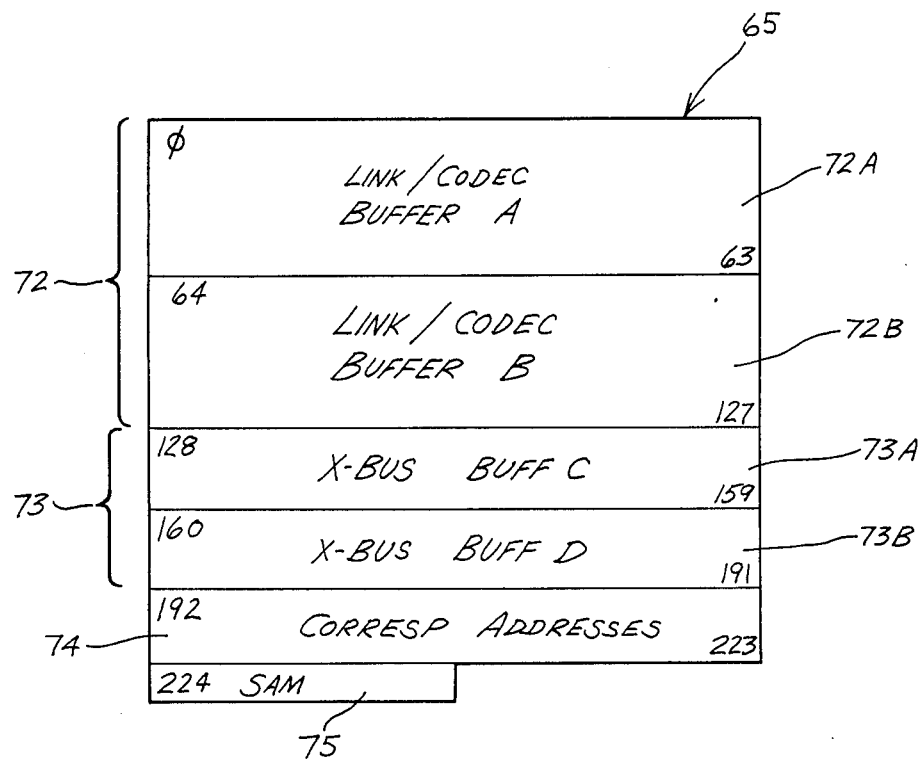
FIG. 7 is a block diagram illustrating the division of memory space in the interface element of FIG. 5.

The interface element is shown in detail in FIG. 5 and its memory allocation is shown in FIG. 7. In the preferred embodiment, the interface element comprises an Xbus interface 57, a link/codec interface 58, a time base 67, a RAM 65, a SE interface 56, RAM write control 66, and SAM 68.

The IE memory, FIG. 7, is a 231×8 bit array made up of a link/codec buffer 72, an Xbus buffer 73, a correspondent address 74 and special access memory (SAM) address locations (used for IE control) 75. The RAM is used for storage of data being passed between the switching element 32 and either of the two resources, Xbus or serial port.

The link codec buffer 72 is divided into two sections, location 0 through 63 (buffer 72A) and locations 64 through 127, (buffer 72B). During any given frame, one of these buffers is accessed by the link codec interface 58 while the other is accessible by the switching element 32.

The Xbus buffer 73 is also divided into two sections, address locations 128 through 159, (buffer 73A), and locations 160 through 191, (buffer 73B). One of these buffers is accessed by the Xbus nnterface 57 while the other is accessible by the switching element 32 during any given frame.

The correspondent addresses 74 are found in address locations 192–223 of RAM 65. The correspondent addresses, each 9 bits, occupy two RAM locations, and are the addresses placed on the Xbus 23 by an active controller during its assigned time slots.

SAM 68 is a special access memory which is used to configure the interface element. The SAM 68 is accessible to the switching element 32 via the SE interface 56 in the same way that the IE RAM 65 is accessible. The contents of the SAM 68 are available fulltime to the interface element module which uses the data. As can be seen in FIG. 7, the SAM address locations 75 are locations 224 through 231 of the IE memory 65. Address 224 is time slot base and address 225 is time slot count. The contents of these registers are used to determine the time slots which are assigned to an individual controller. The time slot counter is reset to 0 after each frame. If the time slot count equals the time slot base, that controller becomes active for the number of time slots indicated in the time slot count register. In the preferred embodiment, the number of assigned time slots is 10. Address 226 is the controller address which is 5 bits in length. Addresses 227 through 230 are mode data locations used by the link/codec interface module. These signals control the links to the digital stations and analog interfaces. Address 231 includes an uplink dataword which indicates uplink errors and must be cleared by the switching element 32 via the SE interface 56.

The SE interface 56 is the means by which the IE RAM 65 and SAM 68 is accessed by the switching element 32. This path consists of a bidirectional 8 bit bus 76, together with control signals which govern its use, IECTL signal 77 and IEBLK lines 78. The IECTL signals on line 77 indicate to the interface element 33, the type of access which the switching element wishes to accomplish. IEBLK 78 is an indication to the switching element that the interface element memory access is limited.

The 8 bit data/address bus 76 is used to pass addresses from the SE to the IE and to pass data between the IE and SE or from the SE to the IE, depending on whether the access is a data fetch or store.

The link/codec interface 58 operates a serial port capable of handling up to 8 256 kilobit/sec channels. The link/codec interface 58 is the means by which the interface element RAM is accessed by station links (links) and trunks links (codecs). The RAM accesses are of doubled buffered RAM areas toggling at a frame rate. Thus, during even numbered frames, link/codec buffer 72A is coupled to the links and buffer 72B is coupled to the switching element. During odd numbered frames, buffer 72A is coupled to the switching element and buffer 72B is coupled to the links.

The Xbus interface 57 is the means by which data is communicated between the interface element and the Xbus 23. Th storage area for Xbus data is double buffered (buffer 73A and buffer 73B of Xbus buffer 73 each having 32 address locations). If buffer 73A is accessed by the Xbus 23 during even numbered frames and by the switching element during odd numbered frames, the buffer 73B is accessed by the switching element during even numbered frames and by the Xbus 23 during odd numbered frames.

SWITCHING ELEMENT

The switching element 32 routes data between the Xbus 23 and the serial data bus 42 (and ultimately between the Xbus 23 and digital phones coupled to the controller or between channels of serial data bus 42). The switching element is shown in detail in FIG. 3. The switching element comprises time base 47, a processor interface 51, memory 54, switching element processor 64 (SEP), digital selector 49, analog selector 50, IE interface 52, sequence 55 and RAM write control 53.

The time base 47 has an input from the clock bus an 8.192 MHz signal (frame) and a 1 KHz signal (superframe). The clock 47 generates outputs which are 2.048 MHz clocks for the 6809 processor 29 and clocking signals for the SEP 64 and the interface element 33.

The SEP 64 is coupled to the SE RAM 54. The SEP 64 controls the flow of data from the superframe buffer and the interface element. These functions are controlled by a program being executed once each frame. This program is located in the working space 54C of the SE RAM 54.

Figure 6:
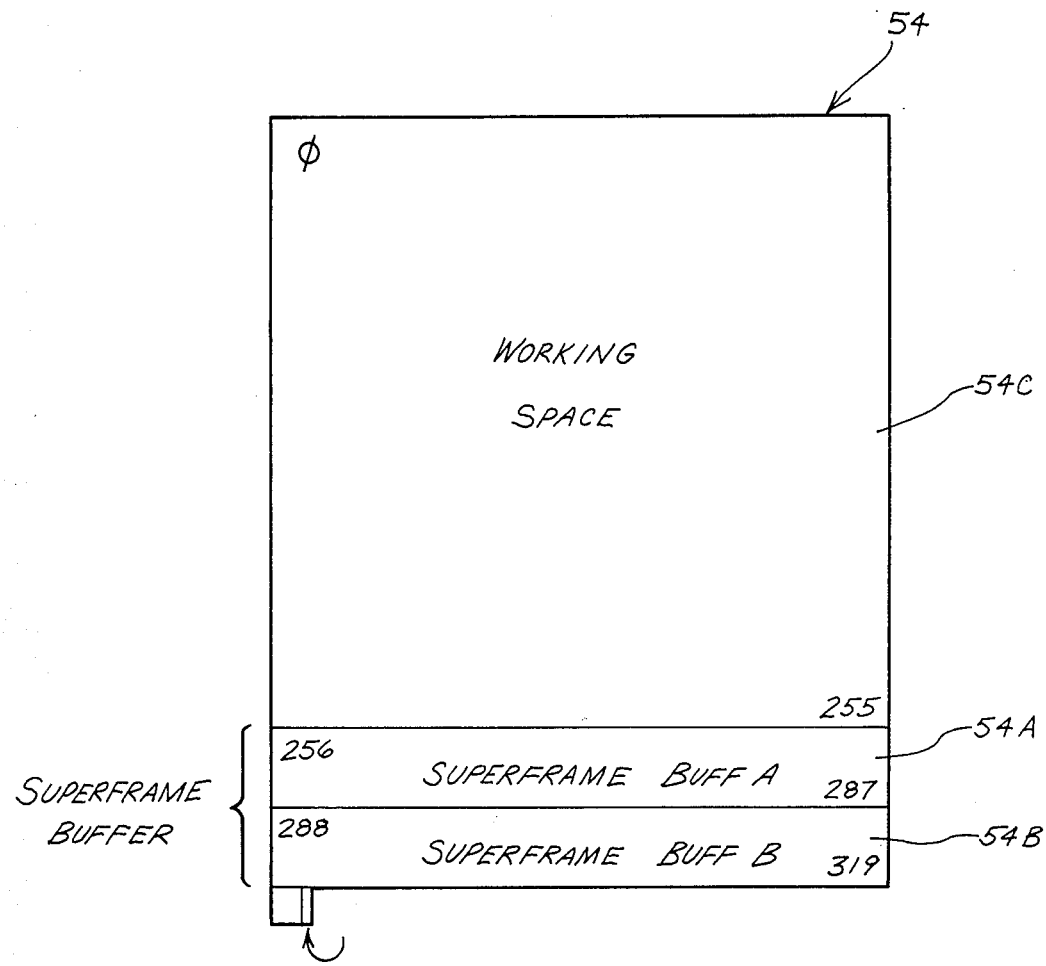
FIG. 6 is a block diagram illustrating the division of memory space in the switching element of FIG. 3.

Memory 54 is a random access memcry with 320 address locations. As shown in FIG. 6, the memory is divided into three parts, working space 54C and a two part superframe buffer. Address 0 through 255 is working space, containing the program executed by SEP 64. This program is executed once each frame (125 microseconds). Address 256 through 319 is a superframe buffer which is further subdivided into two locations, buffer 54A, (address 256 through 287) and buffer 54B (address 288 through 319). The 6809 processor 29 addresses the superframe buffer through processor interface 51.

The processor interface 51 allows an external processor (processor 29) to access the memory 54 of the switching element 32. To the processor 29, the switching element memory 54 is fully accessible at any time by a bi-directional data and address bus. One half of the superframe buffer is accessible during every other superframe, so that in two superframes, the entire memory space can be accessed. The processor interface 51 allows the processor 29 to consider the switching element storage space 54 to be part of its own memory space and to access it at a 2.048 MHz rate. To the switching element memory, operating at 8.192 MHz, the processor interface 56 has access to the space one fourth of the time.

The sequencer 55 generates the control signals for the data selectors 49 and 50 and the RAM write control 53.

The RAM write control 53 generates the RAM write signal from two inputs. The first input is a SEPWRITE signal from the sequencer while the second input is a DMAWRITE signal from the external processor 29. DMAWRITE is asserted when the external processor writes to the RAM 54 and SEPWRITE is asserted with the SEP 64, under program control, writes to the RAM 54.

The IE interface 52 is the means by which the switching element accesses the RAM contents of the interface element. This communication port consists of a bidirectional 8 bit data/address bus, 2 bits of control data transmitted to the interface element, and a single bit of data sent to the switching element by the interface element. The two bits of control data communicate to the interface element the type of access which the switching element wishes to accomplish.

The address data selector 50 controls the RAM address bus. The data selector 50 also controls the double buffering management of RAM 54.

The data in data selector 49 gates the output of the processor interface 51 to the RAM 54. One fourth of the time, the RAM is dedicated to the external processor 29 through the processor interface 51, allowing the external processor full access at a 2.048 MHz.

The controllers send messages over 8 frames (1 millisecond) which is defined in the present invention as a superframe. The superframe buffer is used for data that is to be double buffered at the superframe rate. Duiing normal operation, the processor 29 has access through the processor interface 56 to each buffer 54A and 54B for half of the time, during every other superframe. The SEP 64 has access to the superframe buffer 53 as well but is out of phase with the external processor 29. As there is a time delay in the transmission of data from the SEP 64 to the external processor 29, the selector 49 switches buffers 54A and 54B early or late accordingly. When the SEP 64 is transmitting to the external processor 29, selector 49 outputs a signal LSF prior to the last frame of the superframe, giving processor 29 access to buffer 54B. When SEP 64 is receiving data from the external processor 29, selector49 outputs a signal ESF switching processor 29 to buffer 54B after the initial frame of the superframe. If this switching were not done, it would take 6 frames of one superframe and 2 frames of the next superframe in order to transmit an entire 8 frame message. By including the early and late switching on the part c f the switching element processor, this complication is avoided.

Controllers communicate with each other by intercontroller packets which are transmitted once each superframe. During each frame of a superframe, data is transmitted to the Xbus buffer 73 of the interface element of a controller. After each frame, the SEP (64) of the receiving controller accesses the Xbus buffer 73 and loads the data into the superframe buffer. In order to transfer all of the data in a single superframe, the superframe buffers 54A and 54B of the receiving controller are switched with an ESF signal after the initial frame of the superframe. After all eight frames of the data packet have been stored in th superframe buffer (54A for example) the superframe buffers are switched, making buffer 54A visible to the processor 29. The packet is an 8 byte packet laid out as follows. Two bytes are a destination field identifying the receiving controller. The next two bytes are a sender field identifying the transmitting controller. A one byte command field identifies the nature of the packet with the remaining 3 bytes a reference field containing supporting data.

When a controller is sending data to another controller, it loads a data packet into the superframe buffer. The superframe buffer is then switched with an LSF signal so that the Xbus buffer of the interface element has access to it until after the next to last frame of a true superframe. In this manner, the data packet can be transmitted during a true superframe.

Voice data or transparent "data" data is transmitted from station to station without entering the superframe buffer of the switching element. Each Xbus buffer 73A and 73B has 16 receiving slots and 16 sending slots. An active controller outputs a correspondent address of the receiving controller in the first half of a time slot and reads data in the second half of the time slot. A passive controller compares correspondent addresses on the bus 23 to its own addresses. When there is a match of the first 5 bits, the remaining four bits designate an Xbus buffer location which loads its data onto the Xbus during the second half of the matching time slot.

Figure 16:
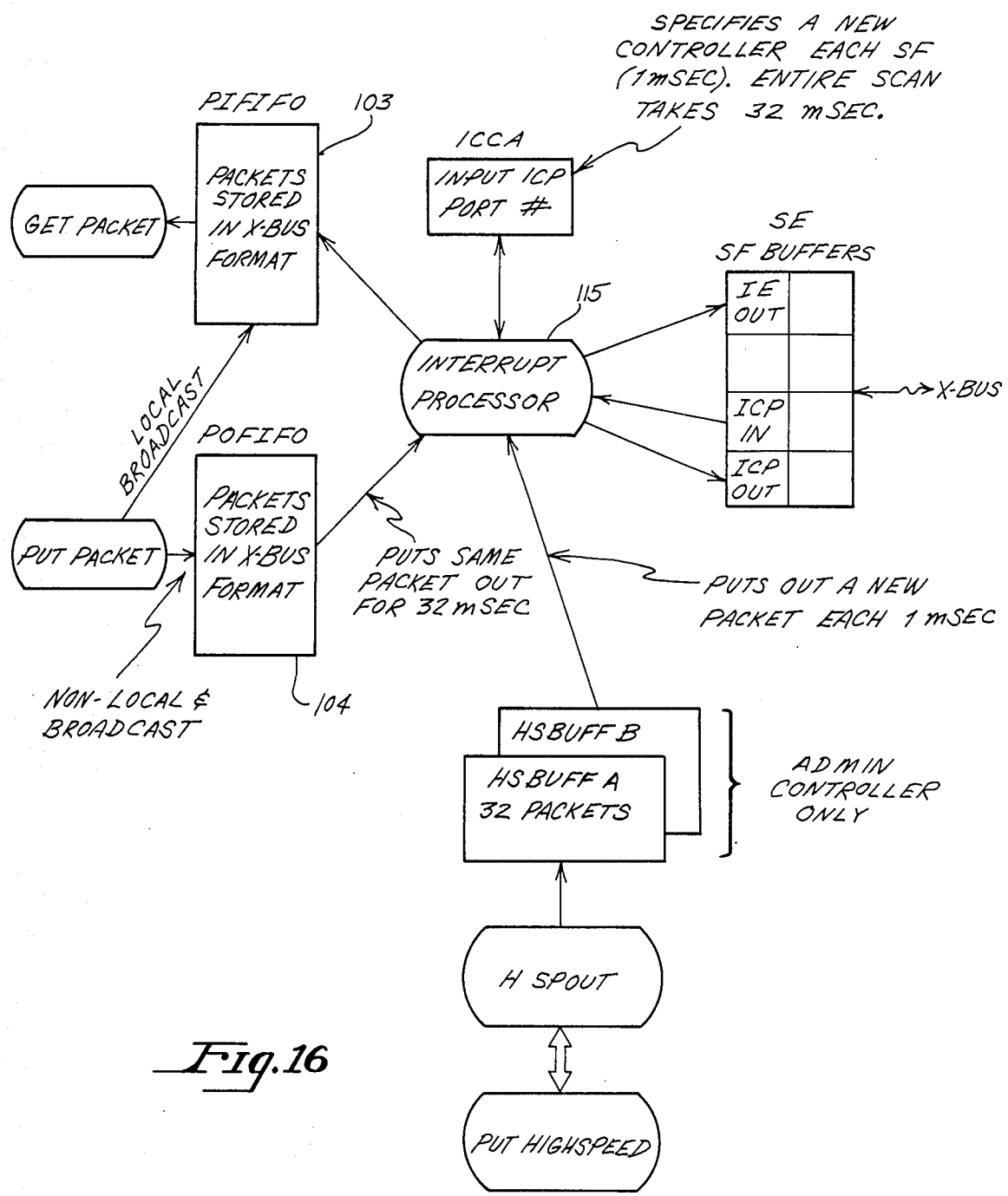
FIG. 16 is a block diagram illustrating controller packet routing.

The following is an example of system operation for a phone call between two digital stations controlled by different controllers. When a user picks up his receiver at a digital station, the digital station outputs a status packet to the controller indicating that it is off hook. As shown in FIG. 16, this packet is placed in a packet out FIFO 104 and placed on the Xbus once each superframe (one millisecond) for 32 milliseconds. In this manner, each controller is updated at the particular station that is off hook. The packet also goes to an interrupt processor 115 and during the one millisecond interrupt, the functional software is requested to provide a dial tone to the receiver of the sending station. The processor 29 then provides a path between the sending station and a controller generating progress tones.

The user of the sending station then dials the first digit of the destination station. This first digit is looked up in a look up table which tells the system that the call is an internal call and not an attempt to access a trunk line. After the first digit is dialed, another packet is provided to the Xbus and eventually to the interrupt processor so that the functional code may turn off the dial tone to the sending station.

After the extension has been dialed, an Xbus packet is prepared including a sender field, destination field, I.D. field and reference field. This packet is placed on the Xbus and received by the controller of the destination station. The directory is polled to determine whether this particular station may be rung. For example, the user may have placed the station in a do not disturb mode or may have forwarded his calls to another station. If the station may be rung, the functional code provides a ringing to the destination station and the sending station. If the destination station is in use, the functional code provides a busy signal to the receiver of the sending station.

If the sending station is picked up, the functional code stops the ringing and a DOAUDIO is performed to set up a voice path between the destination station and the sending station. At this point, a second DOAUDIO is performed to set up a voice path link or between the sending station and the destination station The voice data from the two users is then placed on the Xbus during active frames as previously described.

Thus, a communications switching system has been described which provides switching for as little as 8 lines and up to 144 lines. The control function is distributed so that the amount of control functions required is dependent on the number of lines serviced.

We claim:

1. A communications switching system for enabling transfer of voice, data and control signals between a plurality of ports, said system comprising:
   a time division multiplexed (TDM) bus for carrying said voice, data and control signals;
   a plurality of homogeneous control means coupled to said TDM bus, each of said control means including processing means and storage means;
   a first group of said control means each controlling a fixed number of digital ports, and for selectively coupling said digital ports to said TDM bus;
   a second group of said control means each controlling a fixed number of analog ports, and for selectively coupling said analog ports to said TDM bus
   one of said control means having programming for said first and second groups of control means in said storage means, said one control means providing said programming to said first and second groups of control means during initialization of said system;
   at least one of said second group of control means generating a plurality of progress tones for selectively coupling to said TDM bus;
   each of said control means outputting status information of ports controlled by each of said control means on said TDM bus and monitoring said TDM bus for packets requesting data from one of said control means;
   each of said control means establishing a voice path and a data path between a port controlled by one of said control means and a port requesting communication with said one of said control means;

each of said control means being assigned a fixed number of slots, wherein each control means requests data from other of said control means during assigned time slots an outputs data onto said TDM bus during unassigned time slots.

2. The system of claim 1 wherein said control means comprises:
an interface element for providing access between said control means and said TDM bus;
a switching element coupled to said interface element for routing data between said TDM bus and a serial data bus;
processing means coupled to said switching element, said processing means for controlling said interface element and said switching element;
storage means for storing said programming.

3. The system of claim 2 wherein said interface element comprises: first input/output (I/O) means coupled to said TDM bus;
second I/O means coupled to a link/codec interface;
third I/O means coupled to said switching element;
storage means coupled to said first, second and third I/O means, said storage means having first and second buffers accessed by said first and third I/O means, said storage means further having third and fourth buffers accessed by said second and third I/O means.

4. The system of claim 3 wherein said switching element comprises:
a switching element processor;
fourth I/O means coupled to said switching element processor and said interface element;
fifth I/O means coupled to said switching element processor and said processing means;
storage means coupled to said switching element processor and said fifth I/O means.

5. The system of claim 1 when said plurality of time slots comprises 256.

6. The system of claim 5 wherein each of said time slots is approximately 488 nanoseconds.

7. A distributed control communication switching system for enabling transfer of voice, data and control signals between a plurality of ports, said system comprising:
a time division multiplexed (TDM) bus for carrying said voice, data and control signals;
at least one controller coupled to said bus, said controller for selectively coupling a fixed number of ports to said TDM bus, the number of ports in said system being dependent on the number of controllers coupled to said TDM bus;
said controller outputting status information of said fixed number of ports on said TDM bus and monitoring said TDM bus for packets requesting data from said controller;
said controller establishing a voice path and a data path between one of said fixed number of ports controlled by said controller and a port requesting communication with said one of said fixed number of ports controlled by said controller;
said at least one controller including processing means for controlling said selective coupling of said fixed number of ports to said TDM bus such that control of said system is distributed to said controller;
whereby the number of ports controlled by said system increases as the number of controllers coupled to said TDM bus increases.

8. The system of claim 7 wherein said fixed number of ports comprises eight ports.

9. The system of claim 8 wherein said plurality of ports comprises ports.

10. The system of claim 7 wherein said controller is assigned a fixed number of time slots, said controller requesting data from other of said controllers during assigned time slots and outputting data onto said TDM bus during unassigned time slots.

11. The system of claim 10 wherein said controller includes an interface element for controlling access between said controller and said TDM bus and a switching element coupled to said interface element for routing data between said TDM bus and said ports.

12. The system of claim 11 wherein said interface element comprises:
first input/output (I/O) means coupled to said TDM bus;
second I/O means coupled to a link/codec interface;
third I/O means coupled to said switching element;
storage means coupled to said first, second and third I/O means, said storage means having first and second buffers accessed by said first and third I/O means, said storage means further having third and fourth buffers accessed by said second and third I/O means.

13. The system of claim 12 wherein said switching element comprises:
a switching element processor;
fourth I/O means coupled to said switching element processor and said interface element;
fifth I/O means coupled to said switching element processor and said processing means;
storage means coupled to said switching element processor and said fifth I/O means.

14. A method for providing a time division multiplexed (TDM) bus for carrying voice data and control signals between a plurality of controllers, each controlling a fixed number of ports, said method comprising the steps of:
assigning a fixed number of time slots to each of said plurality of controllers;
defining a controller during its assigned time slots as an active controller;
defining a controller during unassigned time slots as a passive controller;
outputting data requests by an active controller to one or more passive controllers;
outputting data onto said TDM bus by passive controllers wherein a passive controller reads addresses placed on said TDM bus by active controllers and places data on said TDM bus when an address on said TDM bus matches a passive controller's address.

15. The method of claim 14 wherein each of said time slots is approximately 488 nanoseconds.

16. The method of claim 15 wherein said fixed number of time slots comprises 256 time slots.

* * * * *